US008564726B2

(12) United States Patent
Cho et al.

(10) Patent No.: US 8,564,726 B2
(45) Date of Patent: Oct. 22, 2013

(54) STANDARD COLOR REFERENCING PANEL SYSTEM FOR CINEMATOGRAPHING

(75) Inventors: Maeng Sub Cho, Daejeon (KR); Jin Seo Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 733 days.

(21) Appl. No.: 12/682,886

(22) PCT Filed: Mar. 21, 2008

(86) PCT No.: PCT/KR2008/001607
§ 371 (c)(1),
(2), (4) Date: Apr. 13, 2010

(87) PCT Pub. No.: WO2009/051311
PCT Pub. Date: Apr. 23, 2009

(65) Prior Publication Data
US 2010/0225769 A1 Sep. 9, 2010

(30) Foreign Application Priority Data

Oct. 16, 2007 (KR) .................. 10-2007-0104085
Jan. 22, 2008 (KR) .................. 10-2008-0006824

(51) Int. Cl.
H04N 5/222 (2006.01)
H04N 5/228 (2006.01)
H04N 9/73 (2006.01)
H04N 7/00 (2011.01)
G03F 3/10 (2006.01)

(52) U.S. Cl.
USPC ............... 348/722; 348/222.1; 348/223.1; 348/552; 358/527

(58) Field of Classification Search
None
See application file for complete search history.

(56) References Cited

U.S. PATENT DOCUMENTS

| D265,486 S | 7/1982 | Lundell et al. |
|---|---|---|
| 5,687,011 A * | 11/1997 | Mowry ...................... 358/527 |
| 6,618,079 B1 * | 9/2003 | Higuchi .................. 348/223.1 |
| 2005/0057691 A1* | 3/2005 | Dean et al. ................ 348/552 |
| 2005/0122406 A1* | 6/2005 | Voss et al. ............... 348/222.1 |
| 2007/0064119 A1* | 3/2007 | Komiya et al. .......... 348/222.1 |

FOREIGN PATENT DOCUMENTS

| JP | 05-103336 | 4/1993 |
|---|---|---|
| JP | 07-274194 | 10/1995 |

(Continued)

Primary Examiner — Jefferey Harold
Assistant Examiner — Sean Haiem
(74) Attorney, Agent, or Firm — Blakely Sokoloff Taylor & Zafman

(57) ABSTRACT

The present invention relates to a standard color referencing panel system for cinematography that reproduces the original colors of captured images. The standard color referencing panel system for cinematography includes a memory that stores scene display content and standard color display content of an object to be captured; an input unit that allows a user to turn on a power switch and an image capture start switch; a controller that supplies power in response to a power switch on a signal received from the input unit, transmits control signals in response to an image capture start switch on the signal received from the input unit, and reads the scene display content and the standard color display content from the memory; and a display unit that is supplied with power from the controller to preheat a screen, and displays the scene display content and the standard color display content on the screen in response to the control signals transmitted from the controller. According to the above-mentioned structure, it is possible to accurately and easily correct the colors of the captured image, and considerably reduce the time and cost required to correct the colors. As a result, it is possible to exactly reproduce the colors of the captured images and improve the quality of the images.

7 Claims, 16 Drawing Sheets

(56) References Cited

FOREIGN PATENT DOCUMENTS

| JP | 11-234706 | 8/1999 |
| JP | 2000-346707 A | 12/2000 |
| JP | 2002-027396 | 1/2002 |
| JP | 2004-032399 A | 1/2004 |
| JP | 2004-112268 | 4/2004 |
| JP | 2005-176351 A | 6/2005 |
| KR | 10-2002-0078067 | 10/2002 |

* cited by examiner

STANDARD COLOR REFERENCING PANEL SYSTEM FOR CINEMATOGRAPHING

This is a non-provisional application claiming the benefit of International application number PCT/KR2008/001607 filed Mar. 21, 2008.

TECHNICAL FIELD

The present invention relates to a standard color referencing panel system for cinematography. More particularly, the present invention relates to a standard color referencing panel system for cinematography that reproduces the original colors of images captured in a movie shooting location.

The present invention was supported by the IT R&D program of MIC/IITA [2007-P10-23, Development of the Standard for Rendering and Production Process of Digital Images].

BACKGROUND ART

In general, in the image industry, a color correcting process in a post production stage is performed to reproduce the exact colors of images captured in a movie shooting location, and is necessarily executed after all image capturing processes.

However, there is no equipment or instrument for accurately recording and storing information on the season, weather, and lighting during image capture, and these factors have a large effect on the quality of color images. Therefore, an operator has corrected the colors of captured images for each scene depending on operator's experience, supposition, imagination, and knowledge in a post production stage after image capture.

In this case, the colors are corrected depending on operator's experience, skill, and knowledge without any information or data for the colors of images captured in a movie shooting location. Therefore, it is difficult to obtain consistent results. In addition, in the color correcting process, the operator corrects the colors of the images captured in a movie shooting location through much trial and error since the operator performs the color correction depending on operator's experience and suppositions, which requires a lot of time and cost. As a result, video and movie companies are experiencing serious economic difficulties due to low efficiency and high manufacturing costs.

Specifically, as examples, conditions such as the season, weather, and lighting during image capture have a large effect on the colors of captured images. That is, all colors depend on, for example, the season, weather, and lighting. In addition, color characteristics vary according to camera manufacturers and camera models. That is, images captured by cameras made by different manufacturers or different camera models present different colors. In reality, images are captured in different conditions, such as the season, weather, and lighting.

However, video or movie companies do not have equipment or instruments for recording and storing data for variation in the colors of images that are changed according to the season, weather, and lighting during image capture. Therefore, in the post production stage after image capture, the operator should manually correct the colors of the images captured in the movie shooting location without any data for the colors.

In addition, the variation in the colors of the captured images is caused due to the use of cameras made by different camera manufacturers or different camera models with different color characteristics. However, the colors of the images captured by cameras made by different camera manufacturers or different camera models with different color characteristics have been manually corrected without using any equipment or instruments, or any data for the colors.

Therefore, because of correcting the colors of the images captured by cameras with different color characteristics and in different image capture environments without using any equipment or instruments related to the standard colors, a skilled engineer cannot perfectly reproduce the original colors of the images captured in the movie shooting location no matter how much time and money is spent.

Therefore, a standard color referencing panel system for cinematography that is capable of easily checking a variation in colors of a standard color referencing panel and accurately correcting the colors to exactly reproduce the original colors of the images captured in the movie shooting location is needed, even though conditions such as the season, weather, and lighting vary or cameras with different color characteristics are used.

The above information disclosed in this Background section is only for enhancement of understanding of the background of the invention and therefore it may contain information that does not form the prior art that is already known in this country to a person of ordinary skill in the art.

DETAILED DESCRIPTION

Technical Problem

The present invention has been made in an effort to provide a standard color referencing panel system for cinematography that is capable of reproducing original colors of images captured in a movie shooting location.

The present invention has been made in another effort to provide a standard color referencing panel system for cinematography that is capable of correcting colors of images that vary according to conditions such as the season, weather, and lighting of a movie shooting location, or the colors of the images captured by cameras made by different camera manufacturers or different camera models with different color characteristics, thereby accurately reproducing the colors of the images captured in the movie shooting location.

Technical Solution

In order to achieve the objects, according to the present invention, standard colors of a standard color referencing panel system for cinematography that exactly reproduces the original colors of a movie shooting location during image capture are captured before each scene is captured. After the image capture, variation in the captured standard colors is analyzed in a studio, and the analysis result is used to exactly reproduce the colors of the images captured in the movie shooting location during a color correcting process. Therefore, even though all the colors of the captured images vary due to a change in conditions, such as the season, weather, and lighting of the movie shooting location or the use of different cameras with different color characteristics, it is possible to accurately and easily reproduce all the colors in a color correcting stage after image capture.

According to an aspect of the invention, a standard color referencing panel system for cinematography includes: a memory that stores scene display content and standard color display content of an object to be captured; an input unit that allows a user to turn on a power switch and an image capture start switch; a controller that supplies power in response to a power switch on a signal received from the input unit, transmits control signals in response to an image capture start switch on the signal received from the input unit, and reads the scene display content and the standard color display content from the memory; and a display unit that is supplied with power from the controller to preheat a screen, and displays the scene display content and the standard color display content on the screen in response to the control signals transmitted from the controller.

The display unit may display the scene display content including a scene, a cut, and a date on the screen for a predetermined time, and displays standard colors on the screen for a predetermined time.

The standard color referencing panel system for cinematography may further include a signal sound generating unit that generates a signal sound indicating the start of image capture in response to the control signal from the controller.

The standard color referencing panel system for cinematography may further include a unit that indicates the start of image capture in response to the control signal from the controller.

According to another aspect of the invention, a standard color referencing panel system for cinematography includes: a memory that stores scene display content and standard color display content of an object to be captured; a display power button that is turned on by a user to supply power; an image capture start button that operates to indicate the start of image capture; a switch that is turned on when the image capture start button is operated to transmit signals; a display connector that transmits the signal received through the switch; and a scene and standard color display unit that reads the scene display content and the standard color display content from the memory and displays the read content on a screen in response to the signals transmitted from the display connector.

The standard color referencing panel system for cinematography may further include: a rotating unit that is rotated in response to the signals transmitted through the switch; and an indicating unit that is provided above the rotating unit, is maintained at a horizontal position in an initial setting stage, and is rotated to a vertical position by the rotating unit to indicate the start of image capture.

The standard color referencing panel system for cinematography may further include: a button pushing unit that is provided below the rotating unit, is maintained at a horizontal position in an initial setting stage, and is rotated to a vertical position by the rotating unit; a buzzer button that is pushed by the button pushing unit to turn on the switch; a signal sound generating unit that is connected to the buzzer button, and generates a sound signal when the switch is turned on by the buzzer button; and a buzzer that receives the sound signal from the signal sound generating unit and generates a signal sound indicating the start of image capture.

The standard color referencing panel system for cinematography may further include a display auxiliary unit that indicates the start of image capture according to whether the display unit is positioned therein.

The standard color referencing panel system for cinematography may further include: a scene display board that contains the scene display content; a display board fixing member that is provided at an upper part of the screen, and fixes the scene display board when the screen is not operated; a standard color chart that contains the standard color display content; and a standard color chart fixing member that is provided at a lower part of the screen, and fixes the standard color chart when the screen is not operated.

According to still another aspect of the invention, a standard color referencing panel system for cinematography includes: a memory that stores setting/capture start display content, and scene display content and standard color display content of an object to be captured; an input unit that allows a user to turn on a power switch, a setting switch, and an image capture start switch; a controller that supplies power in response to a power switch on signals received from the input unit, transmits control signals in response to a setting switch on signals and an image capture start switch on signals received from the input unit, and reads the setting/capture start display content, the scene display content, and the standard color display content from the memory; and a display unit that is supplied with power from the controller to preheat a screen, and displays the setting/capture start display content, the scene display content, and the standard color display content on the screen in response to the control signals transmitted from the controller.

The display unit may display a setting indicator on the screen when the setting switch is turned on. When the image capture start switch is turned on, the display unit may convert the setting indicator into an image capture start indicator, display the image capture start indicator on the screen, display the scene display content including a scene, a cut, and a date on the screen for a predetermined time, and display standard colors on the screen for a predetermined time.

According to yet another aspect of the invention, a standard color referencing panel system for cinematography includes: a memory that stores setting/capture start display content, and scene display content and standard color display content of an object to be captured; a display power button that is turned on by a user to supply power; a setting/capture start button that is pushed to indicate the start of image capture; a switch that is turned on to transmit a signal when the setting/capture start button is pushed; a display connector that transmits the signal received through the switch; and a scene and standard color display unit that reads the setting/capture start display content, the scene display content, and the standard color display content from the memory and displays the read content on a screen in response to the signal transmitted from the display connector.

The standard color referencing panel system for cinematography may further include: a signal sound generating unit that is turned on in response to the signal transmitted through the switch and generates a sound signal; and a buzzer that receives the sound signal from the signal sound generating unit and generates a signal sound indicating the start of image capture.

According to still yet another aspect of the invention, a standard color referencing panel system for cinematography includes: a scene display board that contains scene display content of an object to be captured; a display board fixing member that is provided at an upper part of the system, and fixes the scene display board; a standard color chart that contains standard color display to content of the object to be captured; a standard color chart fixing member that is provided at a lower part of the system and fixes the standard color chart; an image capture start button that is operated to indicate the start of image capture; a switch that is turned on by the image capture start button; a rotating unit that is rotated in response to a signal transmitted through the switch; an indicating unit that is provided above the rotating unit, is maintained at a horizontal position in an initial setting stage, and is rotated to a vertical position by the rotating unit to indicate the start of image capture; a button pushing unit that is provided below the rotating unit, is maintained at a horizontal position in an initial setting stage, and is rotated to a vertical position by the rotating unit; a buzzer button that is pushed by the button pushing unit to turn on the switch; a signal sound generating unit that is connected to the buzzer button, and generates a sound signal when the switch is turned on by the buzzer button; and a buzzer that receives the sound signal from the signal sound generating unit and generates a signal sound indicating the start of image capture.

According to yet still another aspect of the invention, a standard color referencing panel system for cinematography includes: a scene display board that contains scene display content of an object to be captured; a display board fixing member that is provided at an upper part of the system, and fixes the scene display board; a standard color chart that contains standard color display content of the object to be captured; a standard color chart fixing member that is provided at a lower part of the system and fixes the standard color chart; an image capture start button that is operated to indicate the start of image capture; a switch that is turned on by the image capture start button and transmits a signal; a rotating unit that is rotated in response to the signal transmitted through the switch; and an indicating and signal sound generating unit that is provided in the rotating unit, is maintained at a horizontal position in an initial setting stage, and is rotated to a vertical position by the rotating unit to indicate the start of image capture and to generate a signal sound indicating the start of image capture.

The indicating and signal sound generating unit may include: q-shaped and p-shaped bars that are provided in the rotating unit, pivoted about the rotating unit to be disposed at a horizontal position at an initial setting stage, and pivoted to a vertical position when the rotating unit is rotated so as to contact with each other, thereby generating a fricative sound and indicating the start of image capture; spring members that are provided at one end of each of the q-shaped bar and the p-shaped bar, and are stretched when the q-shaped bar and the p-shaped bar are initially set, to have high restoring force; and a fixing member that fixes the other ends of the spring members.

Advantageous Effects

According to the above-described aspects of the invention, a standard color referencing panel is used to accurately capture the standard colors of a movie shooting location in an image capturing stage, and the captured standard colors are used to correct the colors of the images captured in the movie shooting location in a studio after image capture, thereby exactly reproducing the colors of the images. Therefore, it is possible to accurately and easily correct the colors of images, and considerably reduce the time and cost required to correct the colors. As a result, it is possible to exactly reproduce the original colors of images and thus improve the quality of images. These systems can be applied to all kinds of image capturing processes.

BEST MODE

Figure 1:
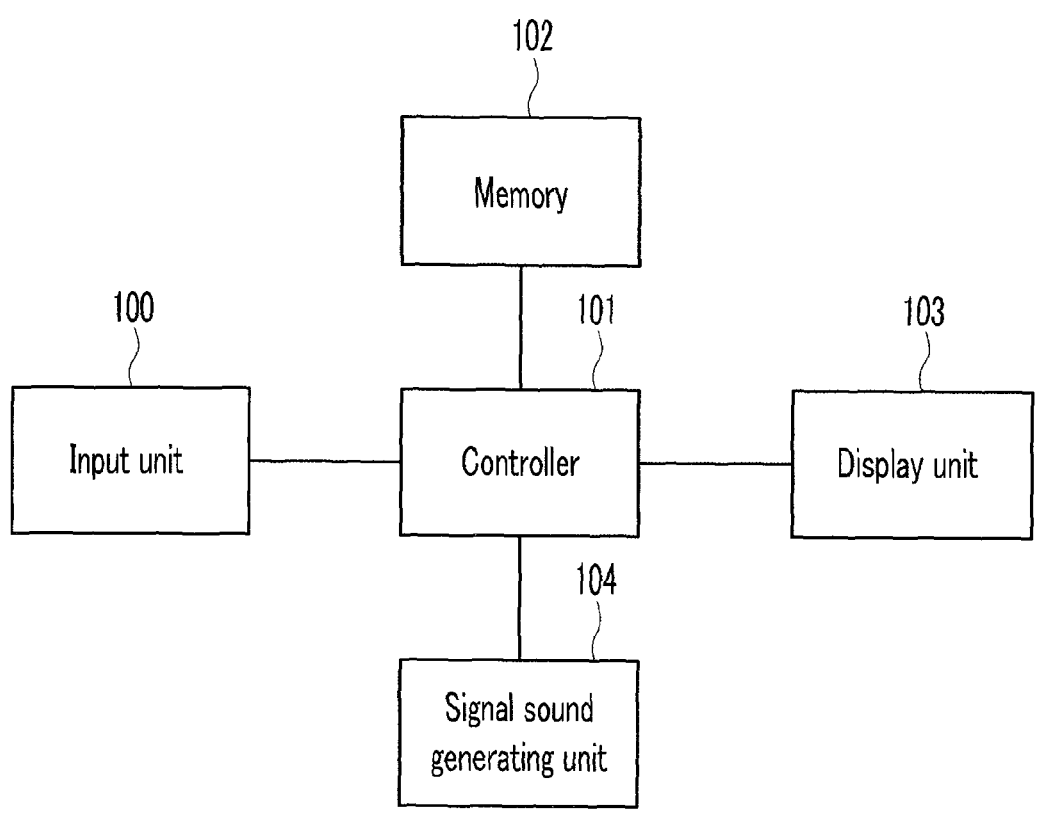
FIG. 1 is a block diagram schematically illustrating the structure of a standard color referencing panel system for cinematography of automatic type A according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. In addition, the terms "-er", "-or", and "module" described in the specification mean units for processing at least one function and operation, and can be implemented by hardware components or software components, and combinations thereof.

A standard color referencing panel system for cinematography according to an exemplary embodiment of the present invention is used to exactly reproduce the scenes and colors captured in locations for, for example, movies, TV programs, and CF (commercial films), and means a standard color referencing panel for cinematography that is used to correct the colors captured in a movie shooting location more exactly than through post production.

Particularly, the standard color referencing panel system for cinematography according to the exemplary embodiment of the present invention is also used to exactly record the states of the standard colors captured in a movie shooting location in an image capture start stage, and uses the recorded information to vividly reproduce the colors of the images captured in the movie shooting location in the studio during a color correction process after image capture.

Specifically, the standard color referencing panel system for cinematography according to the exemplary embodiment of the present invention displays a scene, a cut, the date, the name of a movie director, and the name of a cameraman captured in the movie shooting location, and exactly corrects the colors of the images that vary according to the season, weather, and lighting of a movie shooting location, and the colors of the images captured by digital cameras that are manufactured by different companies or different camera models with different color characteristics, thereby reproducing the original colors of the images. That is, the standard color referencing panel system for cinematography according to the exemplary embodiment of the present invention corrects the colors of the images captured in different surrounding environments or by cameras with different color characteristics in a movie shooting location to exactly reproduce the original colors.

Meanwhile, the standard color referencing panel systems for cinematography according to the exemplary embodiment of the present invention are classified into four kinds, such as automatic type A, automatic type B, manual type A, and manual type B. The term "automatic type" means a standard color referencing panel using an electronic frame, and the term "manual type" means a standard color referencing panel using a board made of wood or plastic and a standard color chart.

Next, the standard color referencing panel systems for cinematography according to the exemplary embodiments of the present invention will be described in more detail.

First, the standard color referencing panel systems for cinematography of automatic types A and B use the electronic frames.

That is, the automatic standard color referencing panel system for cinematography using the electronic frame preheats an electronic frame screen to normalize the color display function of the electronic frame screen, and rotates an arrow portion provided at an upper part of the standard color referencing panel to be horizontal immediately before capturing images in order to initialize the automatic standard color referencing panel system for cinematography. In addition, when all preparations for image capture are completed, the system returns the arrow portion in the vertical direction and outputs signals from a buzzer. Then, the system displays a scene display unit on the electronic frame screen for a predetermined time (e.g., 1 to 3 seconds) while outputting signals indicating the start of image capture. Then, a standard color display unit is displayed for a predetermined time (e.g., 1 to 3 seconds). In this exemplary embodiment of the present invention, the buzzer is used as a unit for generating a signal sound, but the present invention is not limited thereto. Units or devices other than the buzzer, such as bells, may be used as the signal sound generating unit.

Second, the standard color referencing panel systems for cinematography of the manual types A and B each include a board that is provided at the upper half of a white board to allow the user to manually record scene display content and a standard color chart according to the embodiment of the invention that is provided at the lower half of the white plate.

That is, in the manual standard color referencing panel system for cinematography, the user records corresponding data on a scene display unit that is provided at the upper half of a manual standard color referencing panel, attaches a standard color chart to a standard color display unit provided at the lower half of the manual standard color referencing panel, rotates an arrow portion or a q-shaped or p-shaped bar provided at an upper part of a standard color referencing panel in the horizontal direction immediately before image capture in order to initialize the manual standard color referencing panel system for cinematography, and pushes a button to return the arrow portion or the q-shaped or p-shaped bar in the vertical direction after all preparations for image capture are completed. Then, a signal sound indicating the start of image capture is output.

Hereinafter, the standard color referencing panel systems for cinematography according to the exemplary embodiments of the present invention will be described in detail with reference to the accompanying drawings.

First, a standard color referencing panel system for cinematography of automatic type A according to an exemplary embodiment of the present invention will be described.

The standard color referencing panel system for cinematography of automatic type A according to the exemplary embodiment of the present invention is a standard color referencing panel using an electronic frame, in which the operation of an arrow portion and an operation of generating a signal sound indicating the start of image capture are mechanically performed. FIGS. 1 to 11 are diagrams illustrating the structure and operation of the standard color referencing panel system for cinematography of the automatic type A according to the exemplary embodiment of the present invention.

FIG. 1 is a conceptual diagram schematically illustrating the standard color referencing panel system for cinematography of the automatic type A according to the exemplary embodiment of the present invention.

As shown in FIG. 1, the standard color referencing panel system for cinematography of the automatic type A according to the exemplary embodiment of the present invention includes an input unit 100, a controller 101, a memory 102, a display unit 103, and a signal sound generating unit 104.

The input unit 100 transmits a signal for turning on a power switch to preheat an electronic frame screen, which is input by the user, to the controller 101, and also transmits a signal for turning on an image capture start switch to notify the start of image capture, which is input by the user, to the controller 101.

The controller 101 receives the signal for turning on the power switch, which is input by the user, from the input unit 100, and supplies power to the display unit 103. In addition, the controller 101 receives the signal for turning on the image capture start switch, which is input by the user, from the input unit 100, and transmits control signals to the display unit 103 and the signal sound generating unit 104. At the same time, the controller 101 reads scene display content and standard color display content from the memory 102, and transmits the read data to the display unit 103.

The memory 102 stores the prepared scene display content and standard color display content of an object to be captured, and manages the contents.

The display unit 103 is supplied with power under the control of the controller 101, and preheats the electronic frame screen. In addition, the display unit 103 receives the control signals from the controller 101, and displays a message indicating the start of image capture. Further, the display unit 103 displays on the electronic frame screen the scene display content and the standard color display content received from the controller 101. In this exemplary embodiment of the present invention, the display unit 103 displays the message indicating the start of image capture, but the present invention is not limited thereto. A separate unit that displays the message indicating the start of image capture in response to the control signals from the controller 101 may be provided.

The signal sound generating unit 104 generates a loud sound indicating the start of image capture in response to the control signal from the controller 101.

The display unit 103 displays two contents on the electronic frame screen. For example, when the user pushes a start button of the input unit 100, the display unit 103 automatically displays scene information, such as scene, cut, and date, on the electronic frame screen for a predetermined time (e.g., about 1 to 5 seconds), and then automatically displays standard colors on the electronic frame screen with a click sound indicating the start of image capture (i.e., the signal sound generated by the signal sound generating unit 104).

Alternatively, in this embodiment of the invention, when it is difficult to display the scene and the standard colors on the electronic frame screen, a scene display board and a standard color chart, which are formed of thick sheets, may be put on the front surface of the electronic frame screen. That is, the scene display board and the standard color chart are portable and usable, if necessary.

The standard color chart can represent the basic skeleton of a "CIE L*a*b*" color space, which is a standard color space defined by the CIE (International Commission on Illumination). The standard color chart is composed of six chromatic colors, such as red, green, blue, cyan, magenta, and yellow, and achromatic color patches including black and white, and each color patch is represented by coordinates (X, Y, Z) in a "CIE XYZ" standard color space and coordinates (L*, a*, b*) in a "CIE L*a*b*" standard color space.

Figure 2:
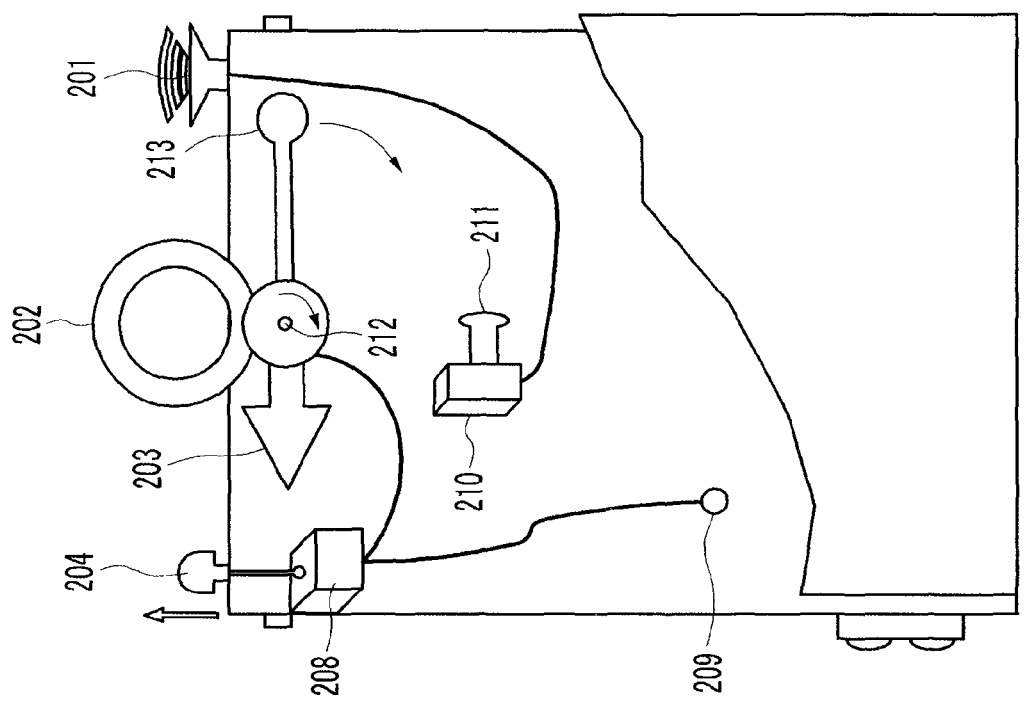
FIG. 2 is a diagram illustrating the front and rear sides of the standard color referencing panel system for cinematography of automatic type A according to the exemplary embodiment of the present invention.
Figure 2:
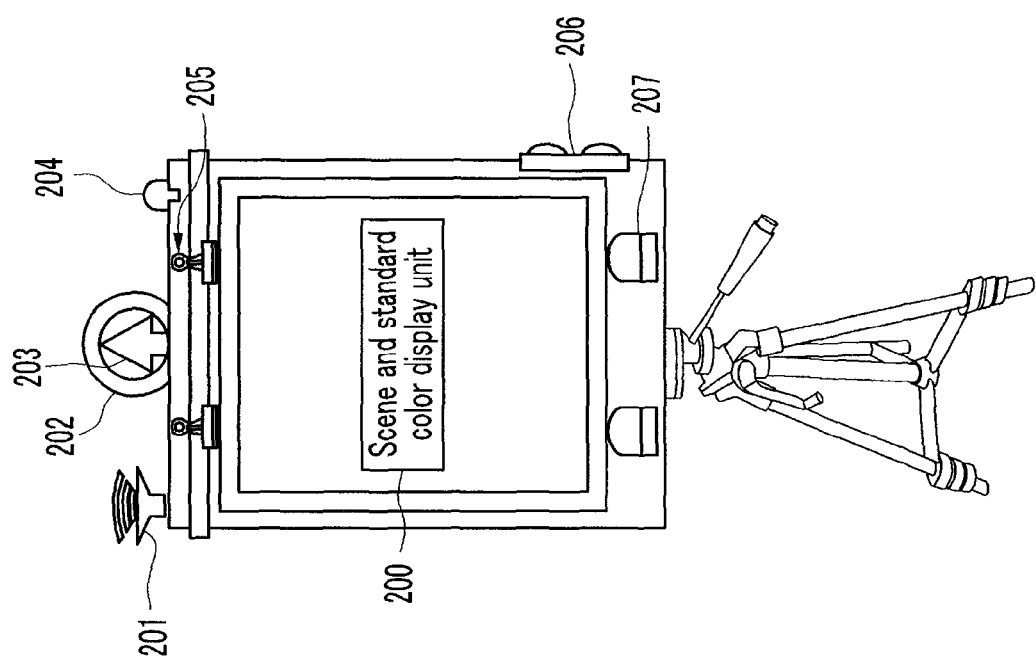

FIG. 2 is a diagram illustrating the front and rear sides of the standard color referencing panel system for cinematography of the automatic type A according to the exemplary embodiment of the present invention.

As shown in FIG. 2, the standard color referencing panel system for cinematography of the automatic type A according to the exemplary embodiment of the present invention includes a scene and standard color display unit 200, a buzzer 201, an O-shaped portion 202, an arrow portion 203, an image capture start button 204, clips 205, a display power button 206, standard color chart support protrusions 207, a button box 208, a display connector 209, a signal sound generating box 210, a buzzer button 211, a rotating shaft 212, and a metal ball 213.

The scene and standard color display unit 200 reads the prepared scene display content and standard color display content of a target to be captured, which is stored in the memory 102 shown in FIG. 1 (e.g., a memory stick), and displays the read content on the electronic frame screen under the control of the to controller 101 shown in FIG. 1. Particularly, when the display power button 206 is pushed and power is transmitted to the electronic frame screen to preheat the electronic frame screen, the scene and standard color display unit 200 receives signals from the display connector 209, reads scene display content 300 shown in FIG. 3 from the memory, and displays the read content on the electronic frame screen for a predetermined time (e.g., 1 to 3 seconds). Then, the scene and standard color display unit 200 displays standard color display content 400 shown in FIG. 4, which is stored in the memory stick, on the electronic frame screen for a predetermined time (e.g., 1 to 3 seconds).

The buzzer 201 is a unit that generates a signal sound by a mechanical operation. The buzzer 201 receives sound signals from the signal sound generating box 210, and generates a loud sound indicating the start of image capture.

The O-shaped portion 202 is provided at a predetermined position (e.g., at an upper part) of the standard color referencing panel system for cinematography of the automatic type A according to the exemplary embodiment of the present invention, and serves as a display auxiliary unit that indicates the start of image capture according to whether the arrow portion 203 is displayed in the O-shaped portion. When the arrow portion 203 is not positioned therein, the O-shaped portion indicates that initial setting has been performed before the start of image capture. On the other hand, when the arrow portion 203 is positioned therein, the O-shaped portion indicates the start of the image capture. In this exemplary embodiment of the present invention, the O-shaped portion 202 is used as the display auxiliary unit, but the present invention is not limited thereto. The display auxiliary unit may be formed in shapes other than the O-shape, such as a rectangular shape and a triangular shape.

The arrow portion 203 is an indicating unit indicating the start of image capture. The arrow portion 203 is set in the horizontal direction at the beginning by the user. Then, when the rotating shaft 212 is rotated, the arrow portion 203 returns to the original position (i.e., a vertical position) to indicate that image capture starts. In this exemplary embodiment of the present invention, the arrow portion 203 is used as the indicating unit, but the present invention is not limited thereto. Other types of indicating units (or indicators) may be used.

The image capture start button 204 is pushed by the user to turn on a switch in the button box 208 in order to notify the start of image capture.

The clips 205 are display board fixing members that fix a scene display board having scene display content therein, and are provided at predetermined positions (e.g., upper parts of the electronic frame screen) of the standard color referencing panel system for cinematography of the automatic type A according to this exemplary embodiment of the present invention. When the electronic frame screen does not operate, the clips fasten a corresponding scene display board. The clips are movable in the vertical direction to adjust the position of the fastened scene display board.

The display power button 206 is pushed by the user to turn on the electronic frame screen. Particularly, the display power button 206 is pushed to transmit power to the electronic frame screen for a predetermined time (e.g., 30 minutes) before image capture starts, thereby preheating the electronic frame screen.

Figure 5:
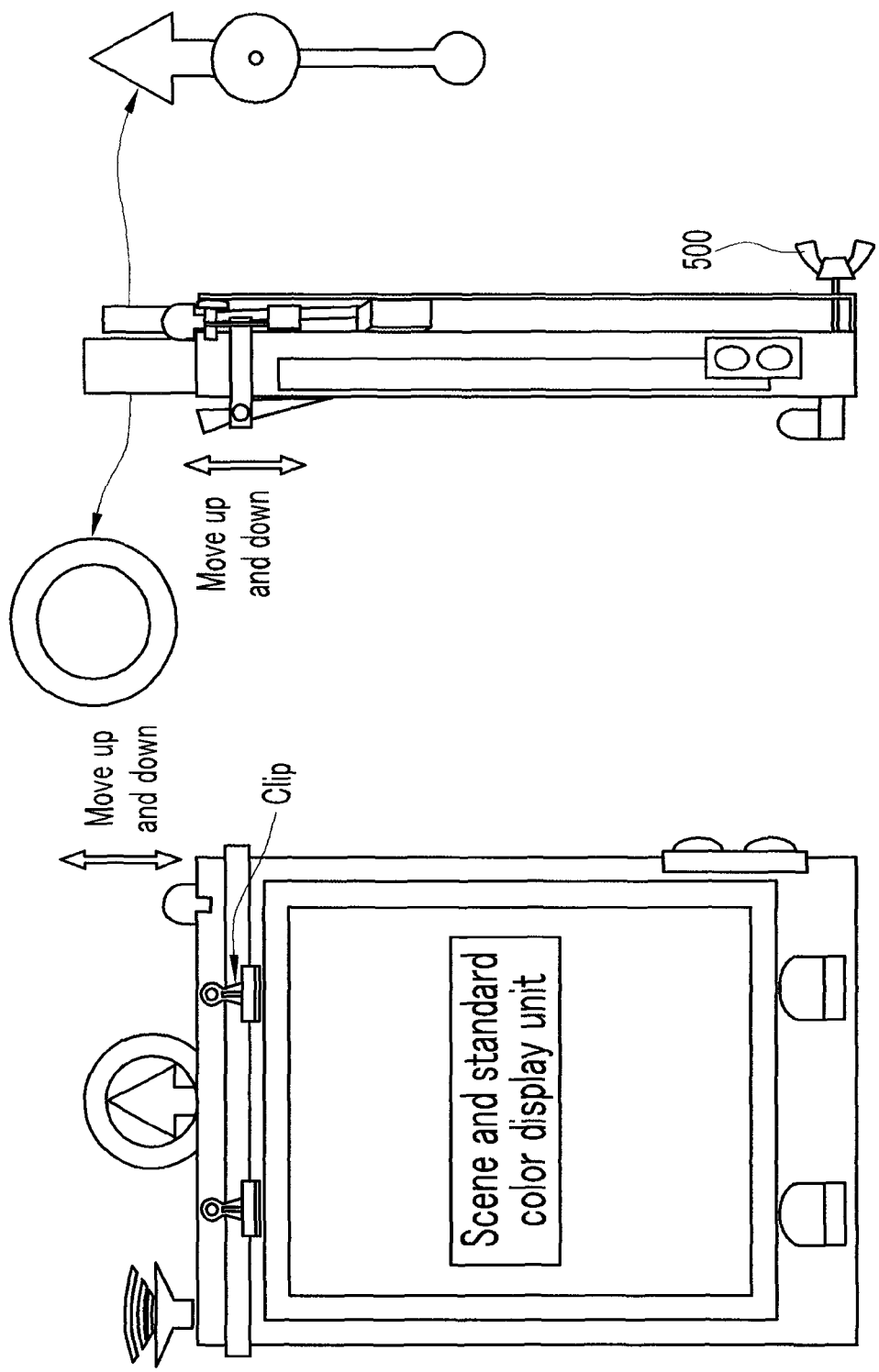
FIG. 5 is a diagram illustrating the front and side of a display unit of the standard color referencing panel system for cinematography of automatic type A according to the exemplary embodiment of the present invention.

The standard color chart support protrusions 207 are standard color chart fixing members that fix a standard color chart having standard color display content therein, and are provided at predetermined positions (e.g., lower parts of the electronic frame screen) of the standard color referencing panel system for cinematography of the automatic type A according to this exemplary embodiment of the present invention. When the electronic frame screen does not operate, the standard color chart support protrusions support the standard color chart. Alternatively, as shown in FIG. 5, a structure 500 composed of a bolt and a wing nut may be formed in the standard color chart support protrusion 207. In this case, the standard color chart is put on the standard color chart support protrusions 207, and the wing nut is fastened to the bolt to set the standard color chart.

The button box 208 is a switching unit provided with a switch. When the image capture start button 204 is pushed, the switch in the button box is turned on to transmit signals to the rotating shaft 212 and the display connector 209.

The display connector 209 receives a signal from the button box 208 when the switch is turned on, and transmits the signal to the scene and standard color display unit 200.

The signal sound generating box 210 is a signal sound generator that generates a signal sound, and includes a switch. The buzzer button 211 is mounted at a predetermined position of the signal sound generating box. When the buzzer button 211 is pushed to turn on the switch of the signal sound generating box, the signal sound generating box generates sound signals and transmits the sound signals to the buzzer 201.

The buzzer button 211 is pushed by the metal ball 213 to turn on the switch in the signal sound generating box 210.

The rotating shaft 212 is a rotating member that has the arrow portion 203 and the metal ball 213 mounted to its upper and lower parts, respectively. The rotating shaft 212 receives signals from the button box 208 when the switch is turned on and operates to rotate the arrow portion 203 and the metal ball 213.

The metal ball 213 serves as a button pushing member that pushes the buzzer button 211. In an initial stage, the metal ball 213 is set in the horizontal direction by the user. Then, when the rotating shaft 212 is rotated, the metal ball returns to the original position (i.e., a vertical position) to push the buzzer button 211. In this exemplary embodiment of the present invention, the metal ball 213 is used as the button pushing member, but the present invention is not limited thereto. Any weight member may be used as the button pushing member as long as it can push the button.

Next, the operation of the standard color referencing panel system for cinematography of the automatic type A according to the exemplary embodiment of the present invention will be described.

First, the user uses a user terminal, such as a PC, to input the prepared scene display content of a target to be captured, and stores the input scene display content in a computer file. Then, the user stores the storage content (i.e., the scene display content) and standard color display content in the memory stick, and transmits data stored in the memory stick to the standard color referencing panel system for cinematography of the automatic type A according to the exemplary embodiment of the present invention. Alternatively, the scene display content and the standard color display content may be stored in the memory 102 shown in FIG. 1 beforehand.

Then, the user pushes the display power button 206 shown in FIG. 2 to operate the display unit 103 shown in FIG. 1. Then, the controller 101 shown in FIG. 1 detects that the display power button 206 has been turned on, and supplies power to the display unit 103 to preheat the electronic frame screen for a predetermined time (e.g., 30 minutes) before image capture. After the preheating process, the color display function of the electronic frame screen is normalized.

Immediately before image capture, the user turns the arrow portion 203 at the upper part of the standard color referencing panel in the horizontal direction to perform an initial setting process.

In this way, when all preparations for image capture are completed, the user pushes the image capture start button 204 to turn on the switch in the button box 208. Then, the on signal is transmitted to the rotating shaft 212 and the display connector 209, and the rotating shaft 212 is rotated in response to the on signal transmitted from the switch of the button box 208.

Then, the arrow portion 203 provided at the upper part of the rotating shaft 212 returns to the original position by the rotation of the rotating shaft 212, and the metal ball 213 provided at the lower part of the rotating shaft 212 is rotated to push the buzzer button 211 in the signal sound generating box 210.

Then, the switch in the signal sound generating box 210 is turned on by the buzzer button 211, and the signal sound generating box 210 generates a sound signal and transmits the sound signal to the buzzer 201. The buzzer 201 receives the sound signal and generates a loud sound indicating the start of image capture.

Meanwhile, with the signal sound indicating the start of image capture, the signal transmitted from the switch of the button box 208 is transmitted to the display unit 103 shown in FIG. 1 through the display connector 209.

Figure 3:
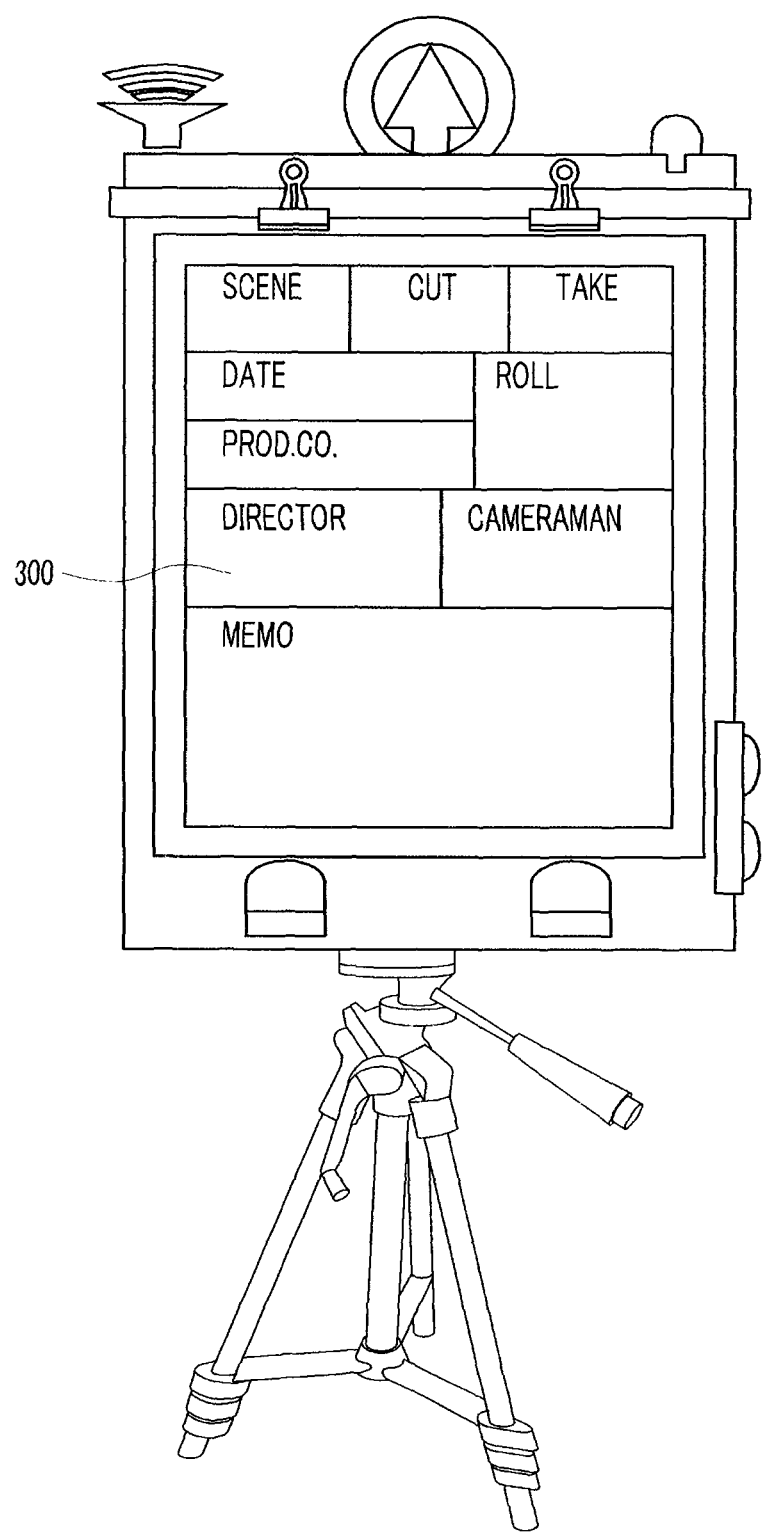
FIG. 3 is a diagram illustrating the scene display of the standard color referencing panel system for cinematography of automatic type A according to the exemplary embodiment of the present invention.

Then, the scene and standard color display unit 200 receives signals from the display connector 209, reads the scene display content 300 shown in FIG. 3, which is stored in the memory stick, and displays the content on the electronic frame screen for a predetermined time (e.g., 1 to 3 seconds). Then, the scene and standard color display unit 200 displays the standard color display content 400 shown in FIG. 4, which is stored in the memory stick, on the electronic frame screen for a predetermined time (e.g., 1 to 3 seconds).

Figure 4:
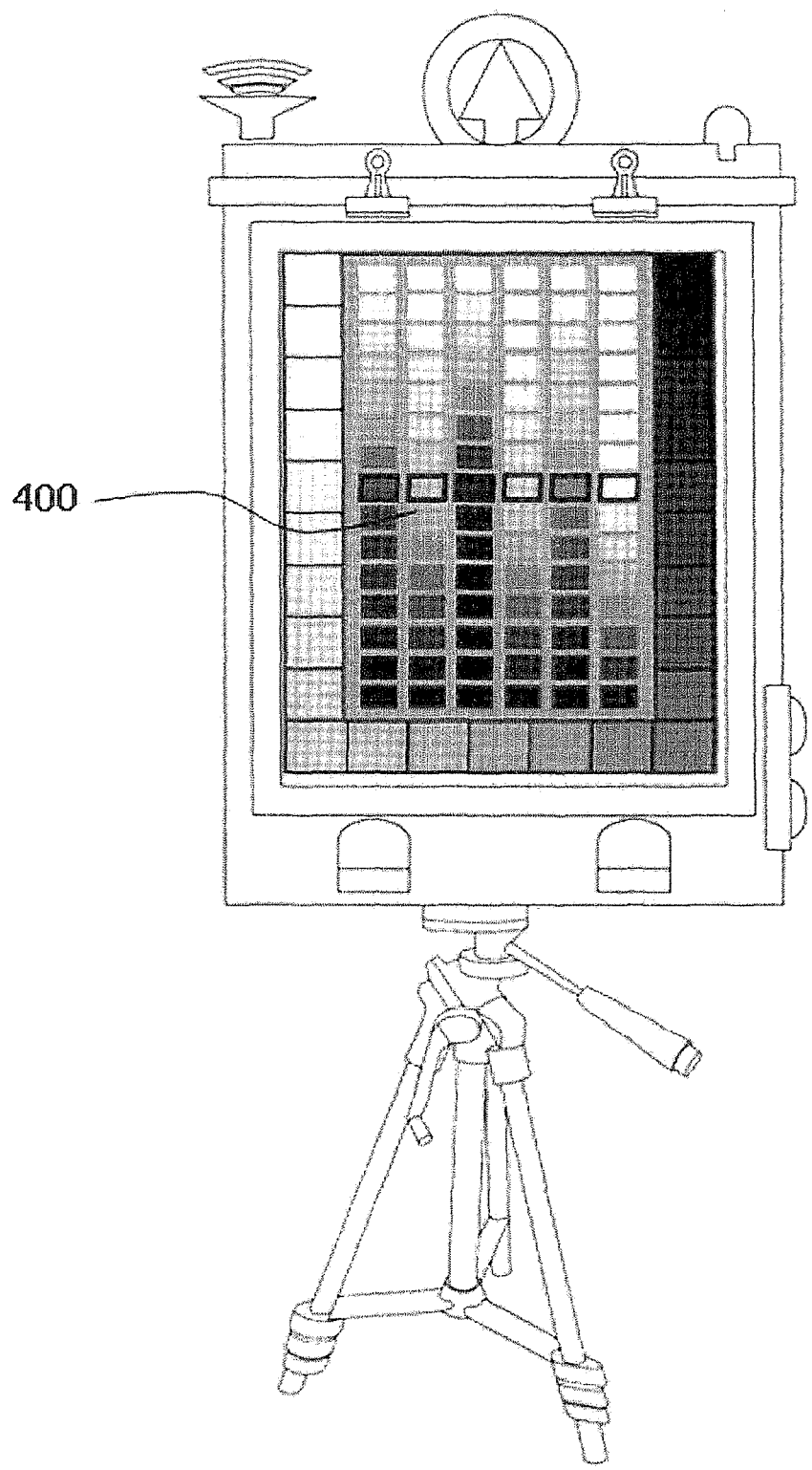
FIG. 4 is a diagram illustrating the standard color display of the standard color referencing panel system for cinematography of automatic type A according to the exemplary embodiment of the present invention.

FIG. 3 is a diagram illustrating an example of the scene display content displayed on the standard color referencing panel system for cinematography of the automatic type A according to the exemplary embodiment of the present invention, and FIG. 4 is a diagram illustrating an example of the standard color display content displayed on the standard color referencing panel system for cinematography of the automatic type A according to the exemplary embodiment of the present invention.

While the series of processes is performed, a movie camera continuously captures images, and then continuously captures desired action scenes. Next, the structure and operation of the standard color referencing panel system of the automatic type A that performs a continuous series of operations in just several seconds will be described.

An example of the rear structure of the standard color referencing panel system for cinematography of the automatic type A according to the exemplary embodiment of the present invention is shown in FIG. 2. An example of the side structure of the standard color referencing panel system for cinematography of the automatic type A according to the exemplary embodiment of the present invention is shown in FIG. 5. FIG. 5 is a diagram illustrating the front and side of a display unit of the standard color referencing panel system for cinematography of the automatic type A according to the exemplary embodiment of the present invention.

The operation principle of the O-shaped portion 202 and the arrow portion 203 in the standard color referencing panel system for cinematography of the automatic type A according to the exemplary embodiment of the present invention will be described below.

Figure 6:
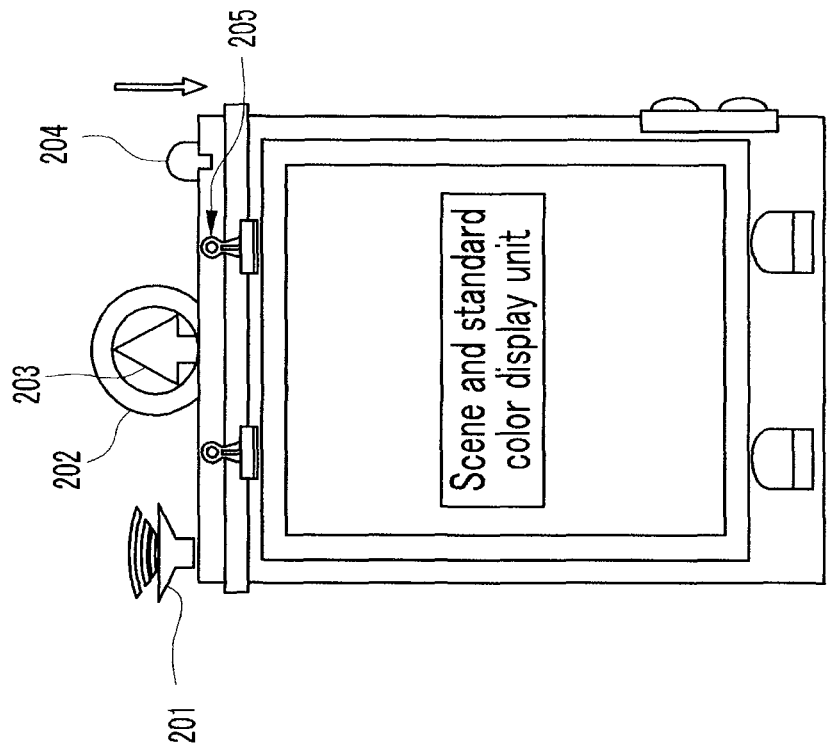
FIG. 6 is a front view illustrating the setting and resetting of an arrow portion of the standard color referencing panel system for cinematography of automatic type A according to the exemplary embodiment of the present invention.
Figure 6:
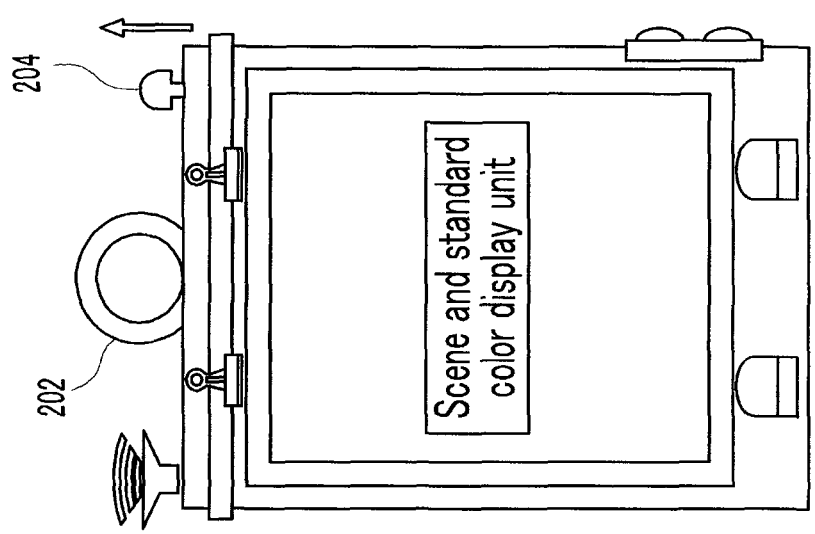

The left front view of FIG. 6, in which only the O-shaped portion 202 is provided at the upper side, shows that setting is performed immediately before image capture, and the right front view, in which the arrow portion 203 appears in the O-shaped portion 202, shows that the image capture start button 204 is pushed to notify the start of image capture. At that time, the buzzer 201 operates to generate a signal sound. FIG. 6 is a front view illustrating the arrow portion set in the O-shaped portion and returned to its original position in the standard color referencing panel system for cinematography of the automatic type A according to the exemplary embodiment of the present invention.

Figure 7:
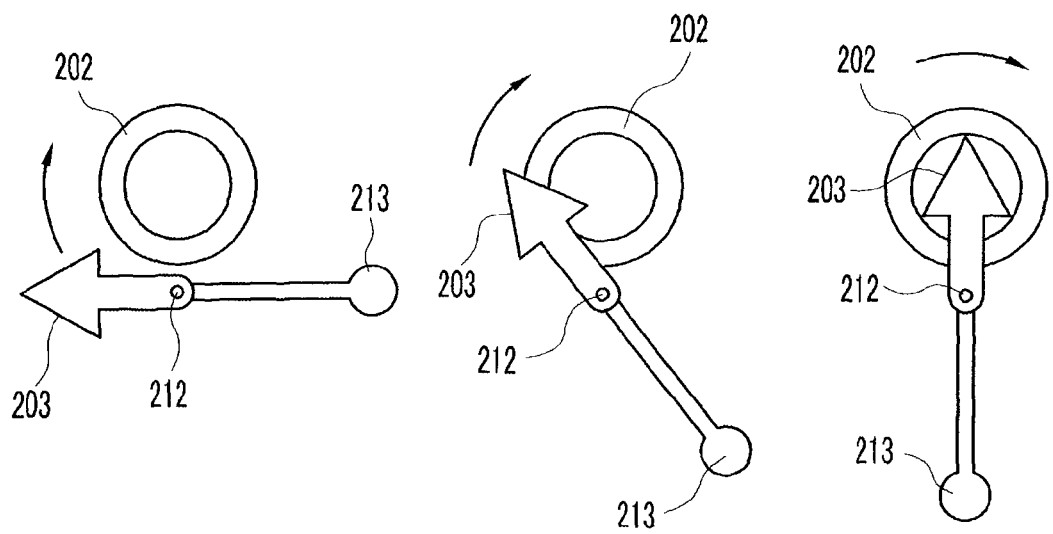
FIG. 7 is a diagram illustrating the operation of the arrow portion of the standard color referencing panel system for cinematography of automatic type A according to the exemplary embodiment of the present invention.

In FIG. 7, the left figure shows the arrow portion 203 set in the horizontal direction, the central figure shows the movement of the arrow portion 203, and the right figure shows the rotating shaft 212 rotated such that the arrow portion 203 is vertically positioned in the O-shaped portion 202 and the metal ball 213 is positioned downward. FIG. 7 is a diagram illustrating the operation of the arrow portion in the standard color referencing panel system for cinematography of the automatic type A according to the exemplary embodiment of the present invention.

Figure 8:
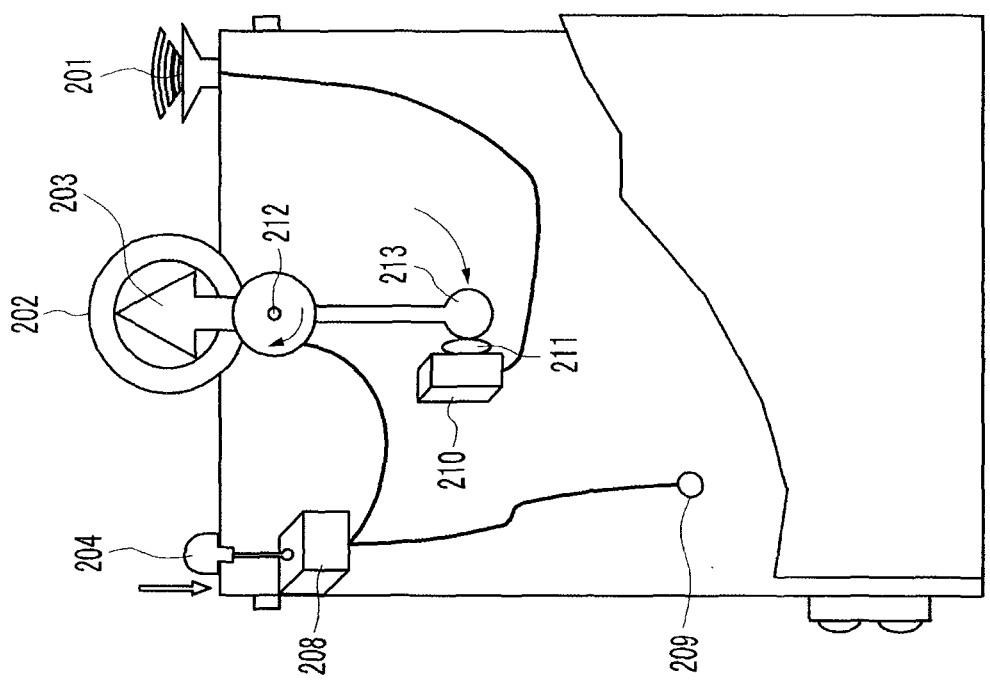
FIG. 8 is a rear view illustrating the setting and resetting of the arrow portion of the standard color referencing panel system for cinematography of automatic type A according to the exemplary embodiment of the present invention.
Figure 8:
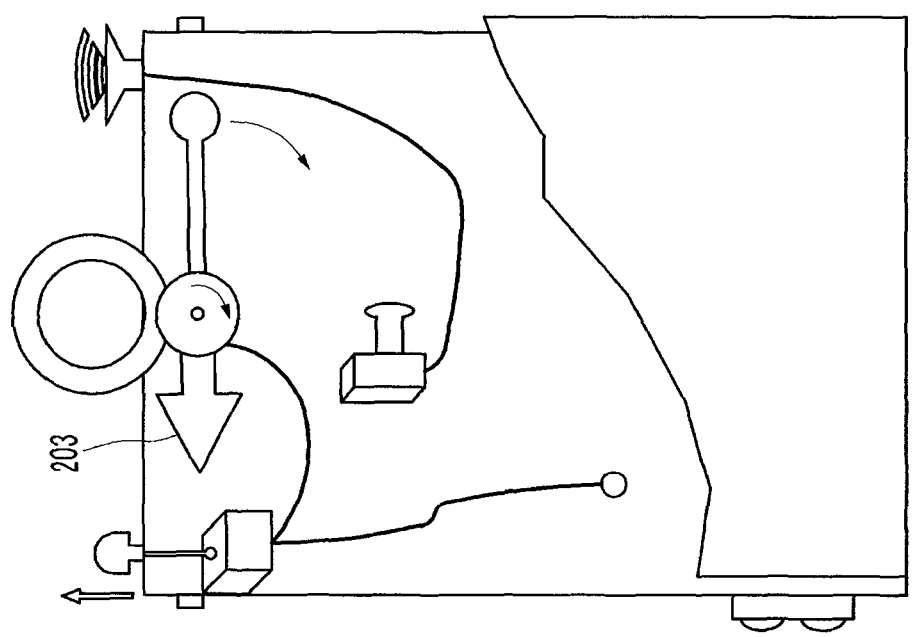

In FIG. 8, the left figure shows the arrow portion 203 that is turned in the horizontal direction to be set in an initial position immediately before image capture. In FIG. 8, the right figure shows the arrow portion 203 turned in the vertical direction. In this case, the displacement of the arrow portion 203 is performed as follows: when all preparations for image capture are completed, the user pushes the image capture start button 204 to turn on the switch in the button box 208; the rotating shaft 212 rotates such that the arrow portion 203 is vertically position in the O-shaped portion 202; the metal ball 213 pushes the buzzer button 211 to turn on the switch in the signal sound generating box 210; and the buzzer 201 generates a loud sound indicating the start of image capture. FIG. 8 is a rear view illustrating the arrow portion set in the O-shaped portion and returned to its original position in the standard color referencing panel system for cinematography of the automatic type A according to the exemplary embodiment of the present invention.

At that time, when the signal sound and the image of the arrow portion 203 in the O-shaped portion 202 are recorded, an exact synchronization process of synchronizing the image with the sound can be performed in a post production stage.

Meanwhile, even though thorough preparation has been made, the electronic frame screen may not operate. In this case, alternatively, as shown in FIG. 9, the user actually writes scene display content on a thick scene display board 900, and attaches the scene display board 900 to the upper half of the standard color referencing panel system for cinematography of the automatic type A according to the exemplary embodiment of the present invention using the clips 205.

Figure 9:
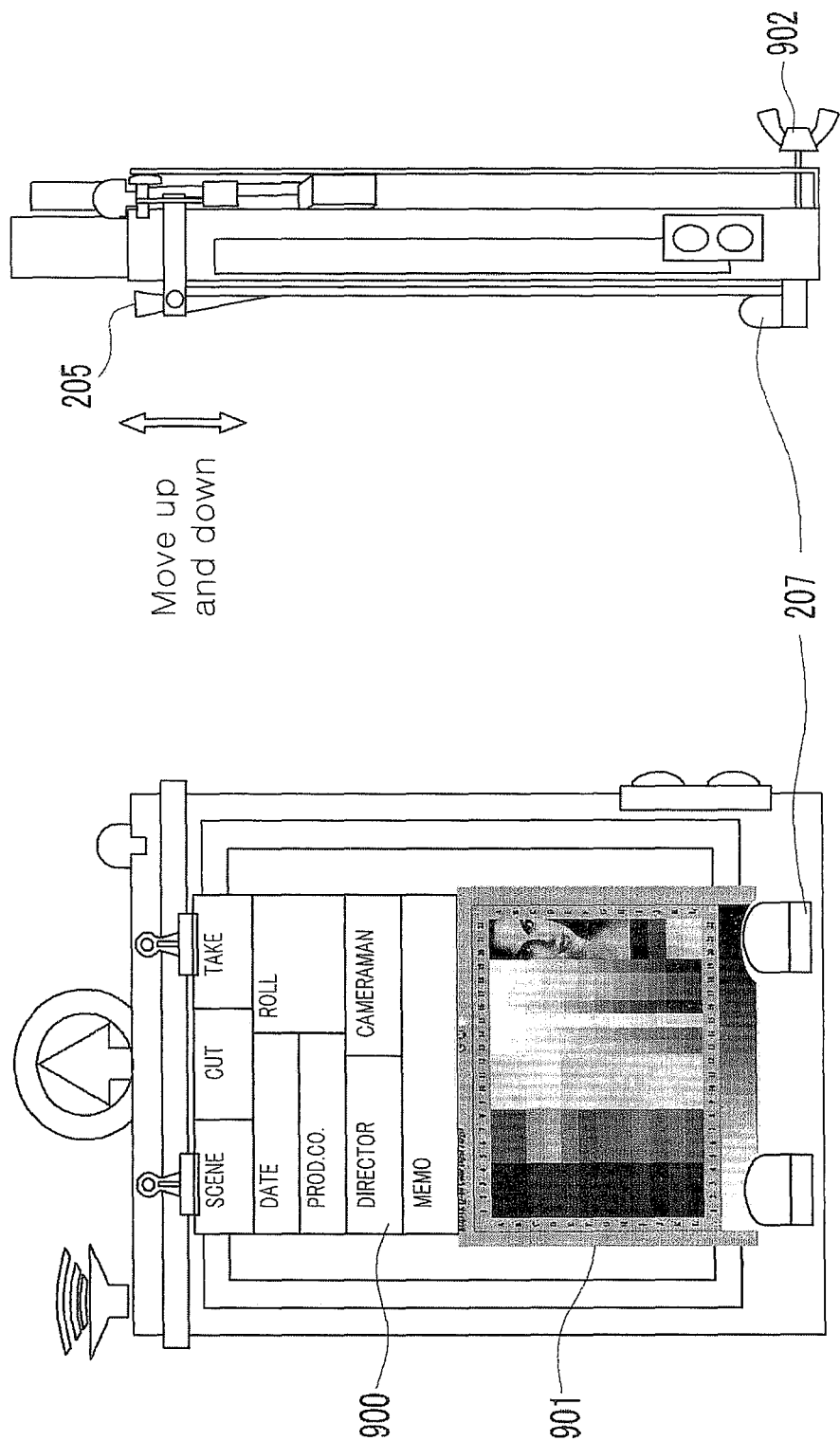
FIG. 9 is a front view and a side view illustrating the usage of a standard color chart of the standard color referencing panel system for cinematography of automatic type A according to the exemplary embodiment of the present invention.

Then, as shown in FIG. 9, a standard color chart 901 is attached to the lower half of the standard color referencing panel system for cinematography of the automatic type A according to the exemplary embodiment of the present invention. In this case, the standard color chart 901 is put on the standard color chart support protrusions 207 that are provided at the lower half of the standard color referencing panel system for cinematography of the automatic type A according to the exemplary embodiment of the present invention, and the wing nuts 902 are fastened to set the standard color chart. FIG. 9 is a diagram illustrating the front and side of the color standard chart attached to the standard color referencing panel system for cinematography of the automatic type A according to the exemplary embodiment of the present invention.

Figure 10:
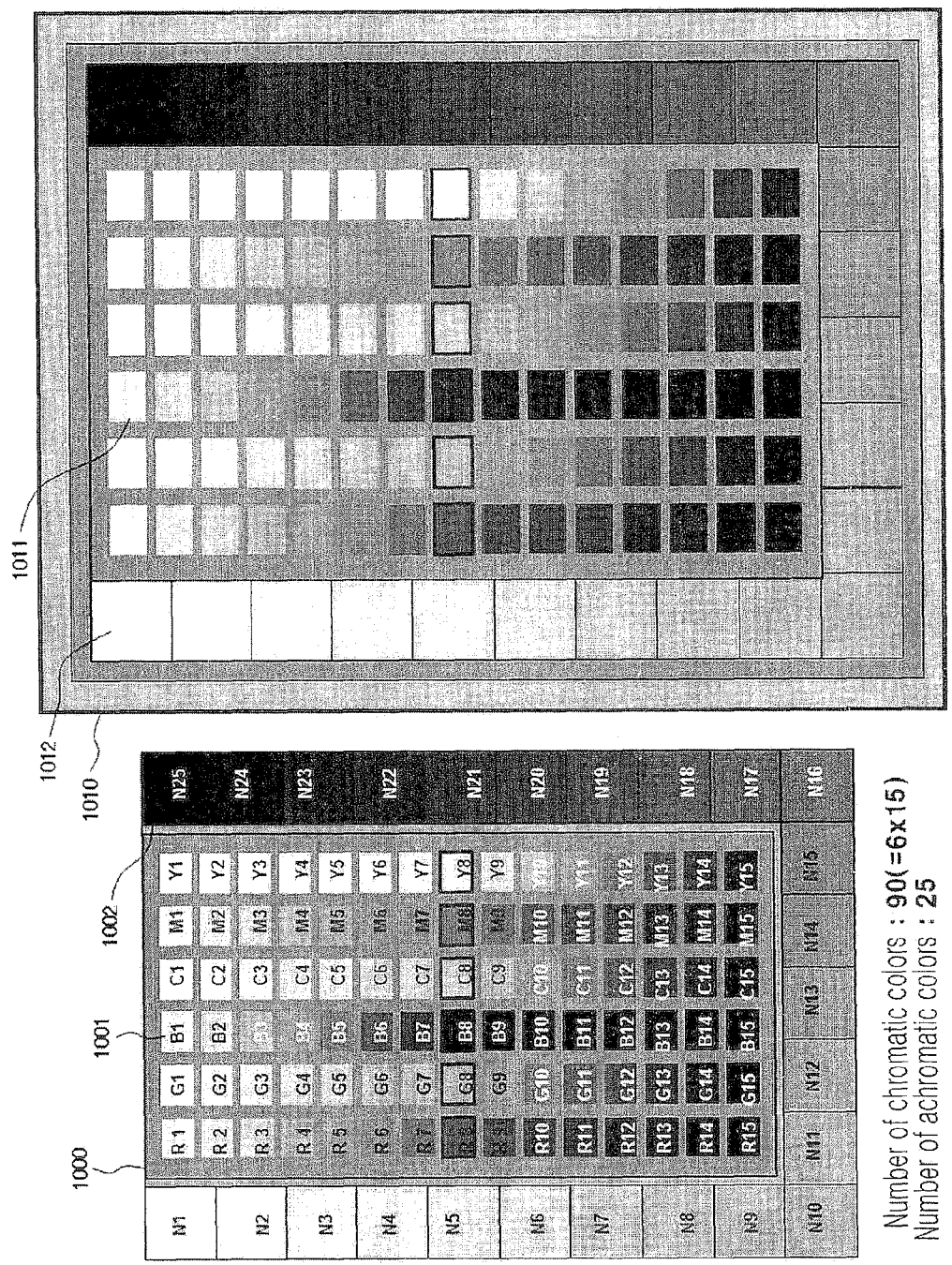
FIG. 10 is a diagram illustrating standard color display content and the standard color chart of the standard color referencing panel system for cinematography of automatic type A according to the exemplary embodiment of the present invention.

In the standard color referencing panel system for cinematography of the automatic type A according to the exemplary embodiment of the present invention, a standard color chart 1000 and standard color display content 1010 may be formed as shown in FIG. 10. In the standard color chart 1000 and the standard color display content 1010, the number of chromatic colors is 90 (=6*15), and the number of achromatic colors is 25. FIG. 10 is a diagram illustrating examples of the standard color display content and the standard color chart of the standard color referencing panel system for cinematography of the automatic type A according to the exemplary embodiment of the present invention.

Figure 11:
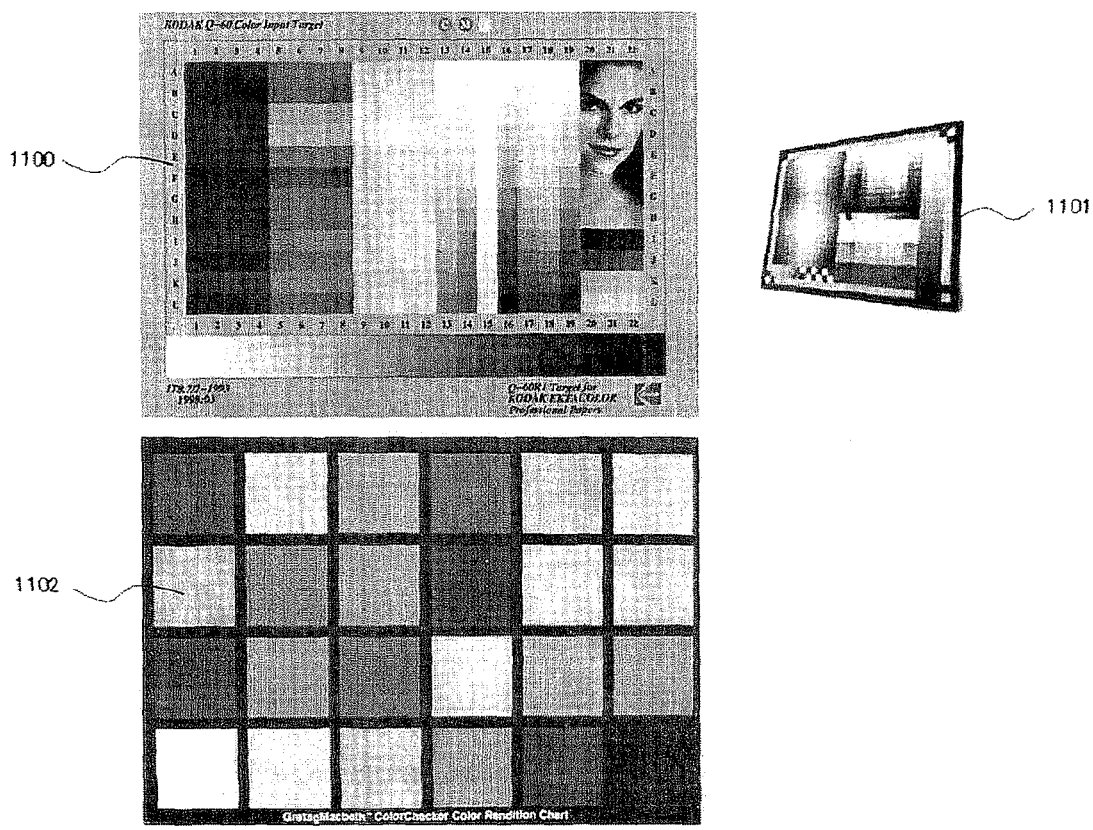
FIG. 11 is a diagram illustrating a general standard color chart.

Alternatively, a general standard color chart 1100, 1101, or 1102 shown in FIG. 11 may be attached to the lower half of the standard color referencing panel system for cinematography of the automatic type A according to the exemplary embodiment of the present invention. In this case, the standard color chart 1100, 1101, or 1102 is put on the standard color chart support protrusions 207 provided at the lower half of the standard color referencing panel system for cinematography of the automatic type A according to the exemplary embodiment of the present invention, and the wing nuts 902 are fastened to se the standard color chart. FIG. 11 is a diagram illustrating examples of the general standard color charts.

Second, a standard color referencing panel system for cinematography of automatic type B according to an exemplary embodiment of the present invention will be described.

Figure 12:
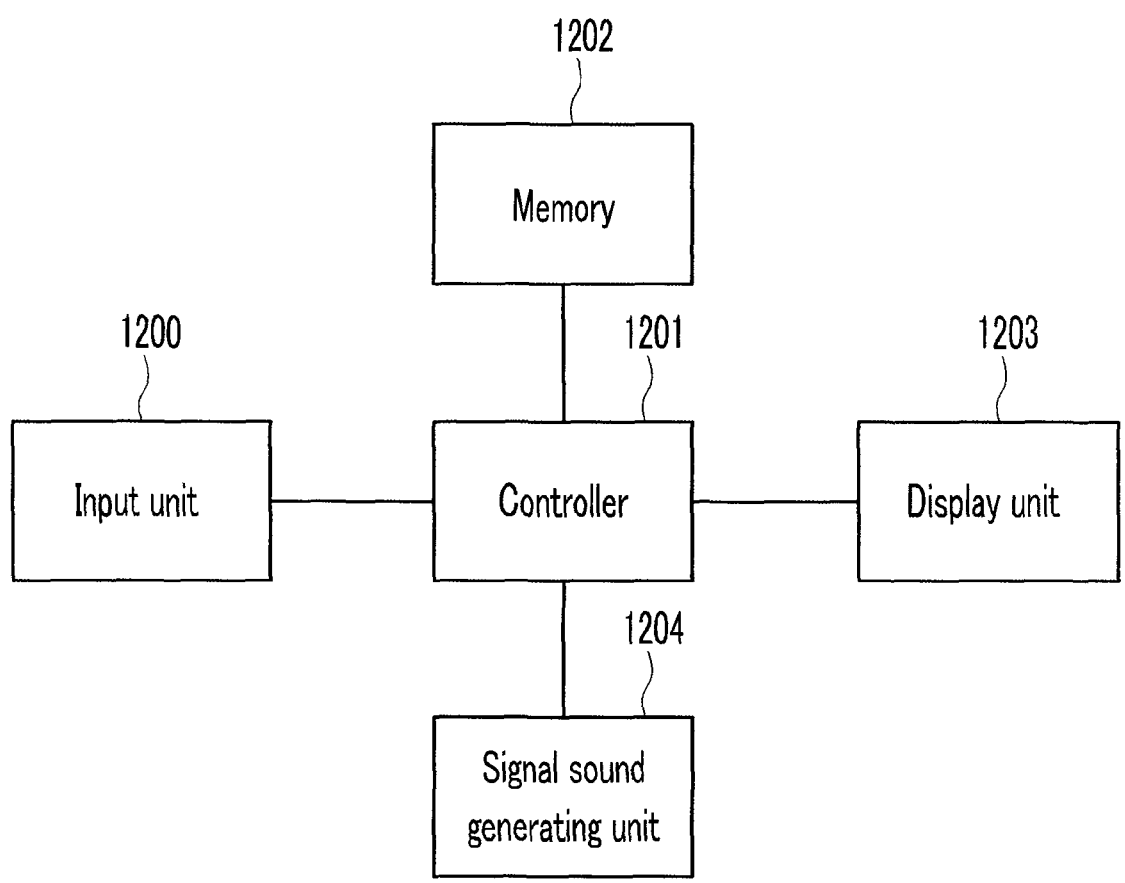
FIG. 12 is a block diagram schematically illustrating the structure of a standard color referencing panel system for cinematography of automatic type B according to an exemplary embodiment of the present invention.
Figure 13:
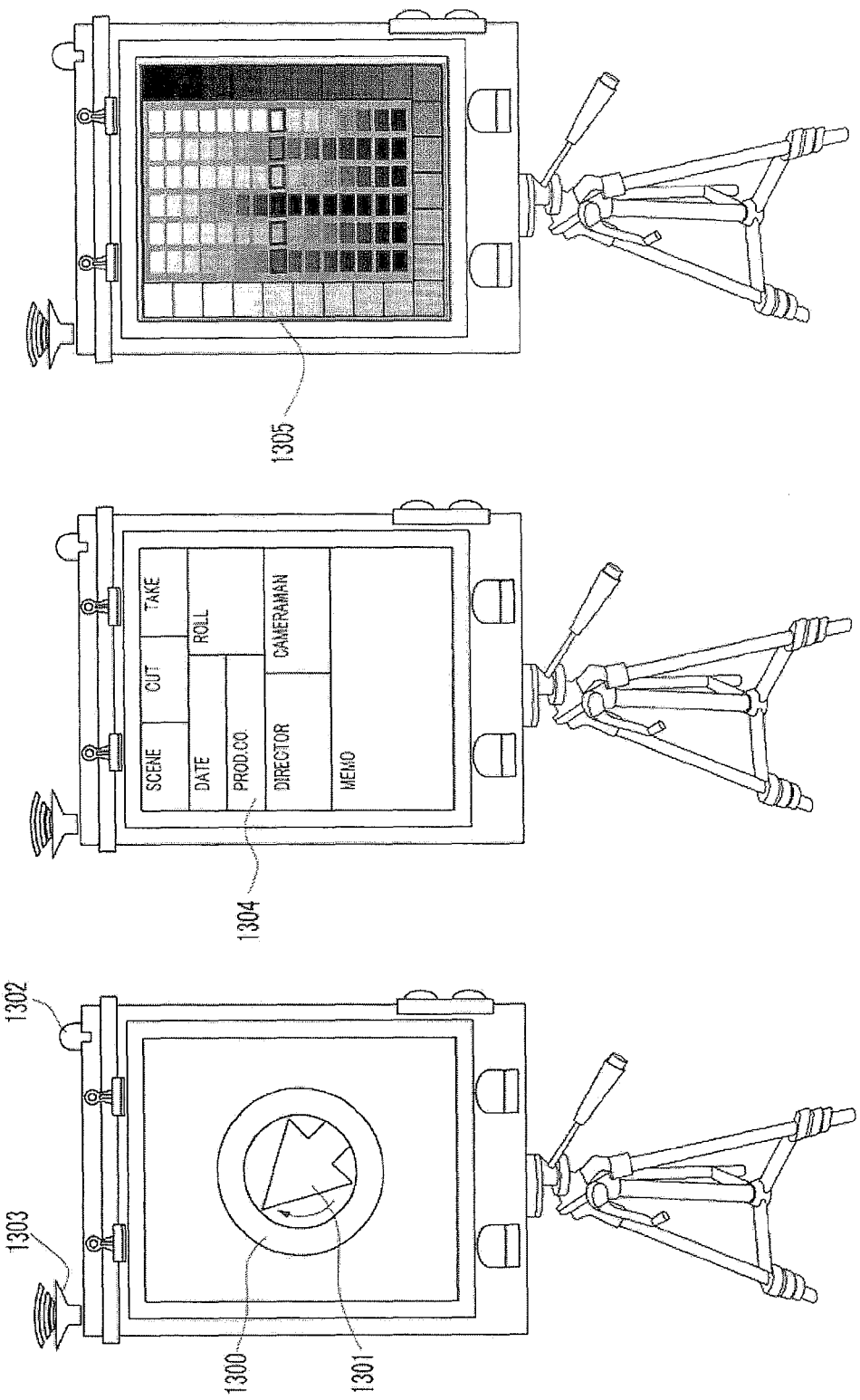
FIG. 13 is a diagram illustrating the display of setting/capture start content, a scene, and standard colors by the standard color referencing panel system for cinematography of the automatic type B according to the exemplary embodiment of the present invention.

The standard color referencing panel system for cinematography of automatic type B according to the exemplary embodiment of the present invention is a standard color referencing panel using an electronic frame, in which the operation of an arrow portion and an operation of generating a signal sound indicating the start of image capture are performed by moving pictures displayed on a display screen of the electronic frame rather than by a mechanical operation. FIGS. 12 and 13 are diagrams illustrating the structure and operation of the standard color referencing panel system for cinematography of the automatic type B according to the exemplary embodiment of the present invention.

FIG. 12 is a conceptual diagram schematically illustrating the standard color referencing panel system for cinematography of the automatic type B according to the exemplary embodiment of the present invention.

As shown in FIG. 12, the standard color referencing panel system for cinematography of the automatic type B according to the exemplary embodiment of the present invention includes an input unit 1200, a controller 1201, a memory 1202, a display unit 1203, and a signal sound generating unit 1204.

The input unit 1200 transmits a signal for turning on a power switch to preheat an electronic frame screen, which is input by the user, to the controller 1201, transmits a signal for turning on a setting switch to initialize setting, which is input by the user, to the controller 1201, and transmits a signal for turning on an image capture start switch to notify the start of image capture, which is input by the user, to the controller 1201.

The controller 1201 receives the signal for turning on the power switch, which is input by the user, from the input unit 1200 and supplies power to the display unit 1203. In addition, the controller 101 receives the signal for turning on the setting switch, which is input by the user, from the input unit 1200, and transmits control signals to the display unit 1203. Further, the controller 1201 receives the signal for turning on the image capture start switch, which is input by the user, from the input unit 1200, and transmits control signals to the display unit 103 and the signal sound generating unit 104. At the same time, the controller 1201 reads setting/capture start display content (e.g., an O-shaped portion 1300 and an arrow portion 1301 shown in FIG. 13), scene display content, and standard color display content from the memory 1202, and transmits the read data to the display unit 1203.

The memory 1202 stores the setting/capture start display content, and the prepared scene display content and standard color display content of a target to be captured, and manages the contents.

The display unit 1203 is supplied with power to preheat the electronic frame screen under the control of the controller 1201. In addition, the display unit 1203 receives the control signals from the controller 1201, and displays the setting/capture start display content received from the controller 1201 on the electronic frame screen. Further, the display unit 1203 receives the control signals from the controller 1201 and displays the scene display content and the standard color display content received from the controller 1201 on the electronic frame screen.

The signal sound generating unit 1204 generates a loud sound indicating the start of image capture in response to the control signal from the controller 1201.

FIG. 13 is a diagram illustrating the setting/capture start display, the scene display, and the standard color display of the standard color referencing panel system for cinematography of the automatic type B according to the exemplary embodiment of the present invention.

First, the setting/capture start display content and the prepared scene display content and standard color display content of a target to be captured are stored in a memory stick, which is a storage device, and data stored in the memory stick is transmitted to the standard color referencing panel system for cinematography of the automatic type B according to the exemplary embodiment of the present invention.

Then, similar to the standard color referencing panel system for cinematography of the automatic type B according to the exemplary embodiment of the present invention, the user pushes the display power button to turn on the scene and standard color display unit (i.e., the display unit 1203), thereby preheating the electronic frame screen for a predetermined time (e.g., 30 minutes).

In FIG. 13, the left figure shows the setting/capture start display content displayed on the electronic frame screen by the display unit 1203 immediately before image capture. That is, a moving picture showing the movement of an arrow 1301 in the vertical direction in the O-shaped portion 1300 is displayed on the electronic frame screen, instead of a mechanical operation. When the arrow 1301 turns to a vertically position on the electronic frame screen, a signal sound is output.

In the left figure shown in FIG. 13, first, when the user pushes a setting/capture start button 1302, the input unit 1200 transmits a signal for turning on a setting switch to initialize setting, which is input by the user, to the controller 1201, and the controller 1201 receives the signal for turning on the setting switch from the input unit 1200 and transmits control signals to the display unit 1203. At the same time, the controller reads setting display content from the memory 1202 and transmits the read data to the display unit 1203.

Then, the display unit 1203 receives the control signals from the controller 1201, and displays the setting display content transmitted from the controller 1201 on the electronic frame screen. In this case, the display unit 1203 displays the arrow 1301 to be set in the horizontal direction in the O-shaped portion on the electronic frame screen.

Then, when the user pushes the setting/capture start button 1302 after the preparation of image capture has been completed, the input unit 1200 transmits the signal for turning on the image capture start switch to notify the start of image capture, which is input by the user, to the controller 1201. Then, the controller 1201 receives the signal for turning on the image capture start switch, which is input by the user, from the input unit 1200, and transmits control signals to the display unit 1203 and the signal sound generating unit 1204. At the same time, the controller reads image capture start display content from the memory 1202, and transmits the read data to the display unit 1203. In this exemplary embodiment of the present invention, the button 1302 is used to start both the setting process and the image capture process, but the present invention is not limited thereto. A setting button for starting setting before image capture and an image capture start button for notifying the start of image capture may be separately provided.

Similar to the standard color referencing panel system for cinematography of the automatic type A according to the above-mentioned exemplary embodiment of the present invention, when the setting/capture start button 1302 is pushed to turn on the switch in the button box, an on signal is transmitted to a sound generating box (i.e., the signal sound generating unit 1204) and a display connector. Then, the signal sound generating unit 1204 receives the on signal and generates a signal sound indicating the start of image capture, thereby outputting sounds from the buzzer 1303. Further, while the signal sound indicating the start of image capture is output, the signal transmitted through the switch in the button box is transmitted to the display unit 1203 through the display connector.

Then, the display unit 1203 receives control signals from the controller 1201, and displays the image capture start display content transmitted from the controller 1201 on the electronic frame screen. In this case, the display unit 1203 displays the arrow 1301 to return to a vertical position in the O-shaped portion 1300 on the electronic frame screen.

Then, as shown in the central figure of FIG. 13, the controller 1201 reads scene display content from the memory 1202, and transmits the read data to the display unit 1203. The display unit 1203 receives control signals from the controller 1201, and displays scene display content 1304 transmitted from the controller 1201 on the electronic frame screen for a predetermined time (e.g., 1 to 3 seconds).

As shown in the right figure of FIG. 13, the controller 1201 reads standard color display content from the memory 1202, and transmits the read data to the display unit 1203. The display unit 1203 receives control signals from the controller 1201, and displays standard color display content 1305 transmitted from the controller 1201 on the electronic frame screen for a predetermined time (e.g., 1 to 3 seconds).

Third, a standard color referencing panel system for cinematography of manual type A according to an exemplary embodiment of the present invention will be described below.

The standard color referencing panel system for cinematography of the manual type A according to the exemplary embodiment of the present invention is a standard color referencing panel of manual type A that uses a board and a standard color chart that are formed of wood or plastic, without using the electronic frame. In the standard color referencing panel system for cinematography of the manual type A according to the exemplary embodiment of the present invention, an arrow portion is mechanically operated to notify the start of image capture, the generation of a signal sound is electrically performed using a buzzer.

Figure 14:
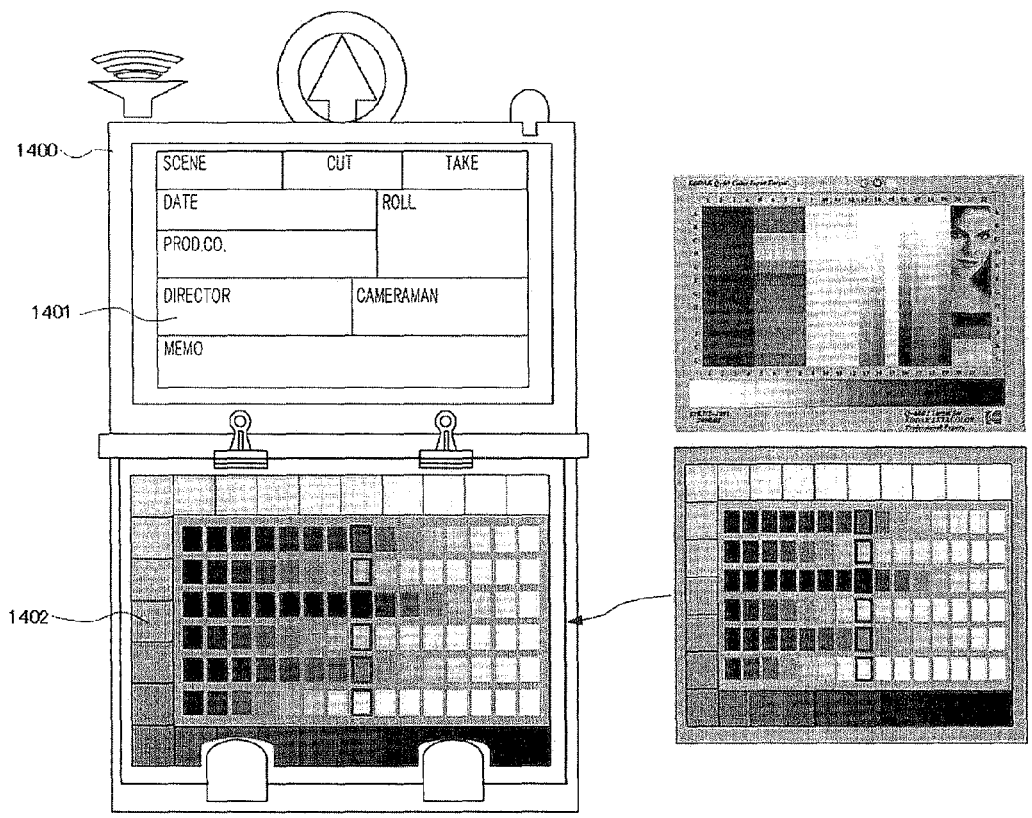
FIG. 14 is a diagram illustrating a standard color referencing panel system for cinematography of manual type A according to an exemplary embodiment of the present invention.

FIG. 14 is a diagram illustrating the structure of the standard color referencing panel system for cinematography of the manual type A according to the exemplary embodiment of the present invention.

In the standard color referencing panel system for cinematography of the manual type A according to the exemplary embodiment of the present invention, the operation of the arrow portion and the structure and the operation of a mechanism for generating the signal sound are the same as those in the standard color referencing panel system for cinematography of the automatic type A according to the above-described exemplary embodiment of the present invention.

As shown in FIG. 14, in the standard color referencing panel system for cinematography of the manual type A according to the exemplary embodiment of the present invention, a board 1400 that is formed of, for example, wood or plastic, and has scene display content 1401 written thereon is provided at the upper part of the system, and a standard color chart 1402 is provided at the lower part thereof. The scene display content 1401 and the standard color chart 1402 are the same as those in the standard color referencing panel system for cinematography of the automatic type A according to the above-described exemplary embodiment of the present invention.

Fourth, a standard color referencing panel system for cinematography of manual type B according to an exemplary embodiment of the present invention will be described below.

Figure 15:
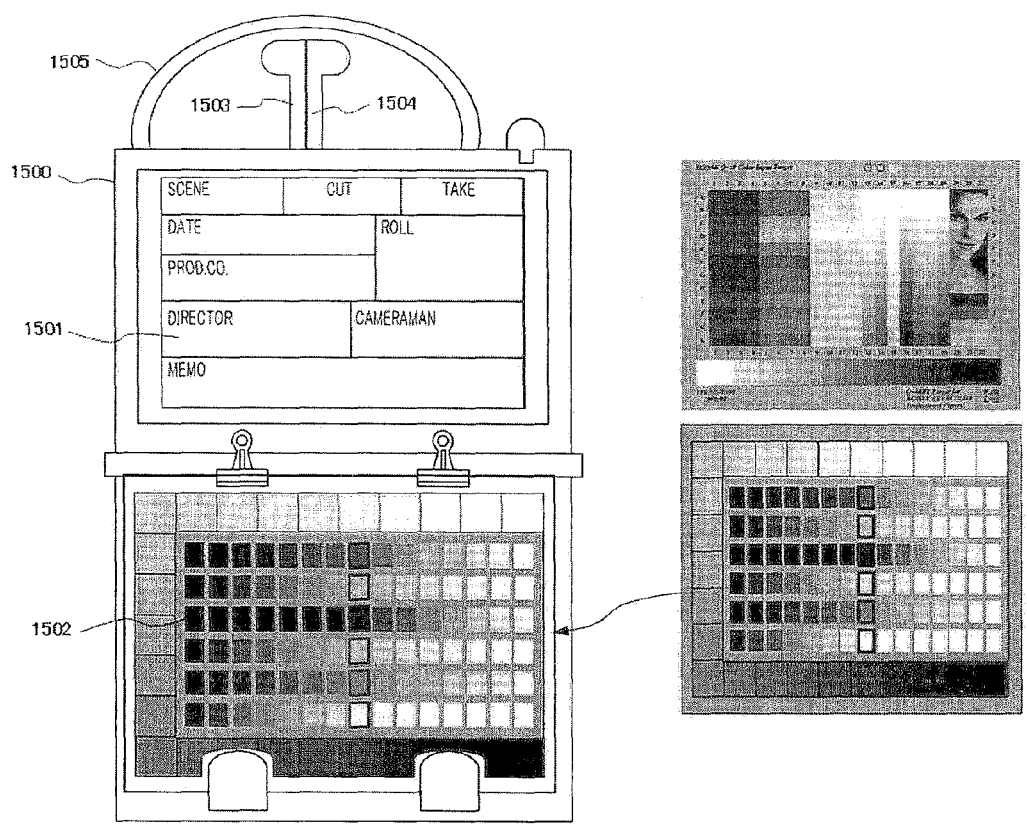
FIG. 15 is a diagram illustrating a standard color referencing panel system for cinematography of manual type B according to an exemplary embodiment of the present invention.

FIG. 15 is a diagram illustrating the structure of the standard color referencing panel system for cinematography of the manual type B according to the exemplary embodiment of the present invention.

As shown in FIG. 15, the standard color referencing panel system for cinematography of the manual type B according to the exemplary embodiment of the present invention is a standard color referencing panel of manual type B that uses a board 1500 and a standard color chart 1502, without using the electronic frame. The board 1500 is formed of, for example, wood or plastic, has scene display content 1501 written thereon, and is provided at the upper part of the system, and the standard color chart 1502 is provided at the lower part thereof. The scene display content 1501 and the standard color chart 1502 are the same as those in the standard color referencing panel system for cinematography of the manual type A according to the above-described exemplary embodiment of the present invention.

In the standard color referencing panel system for cinematography of the manual type B according to the exemplary embodiment of the present invention, instead of indicating the start of image capture with the arrow portion, the start of image capture is indicated by the mechanical operation of a q-shaped bar 1503 and a p-shaped bar 1504 provided in a half circle member 1505 at the top of the system, and a signal sound is mechanically generated, that is, a fricative sound is generated when the two bars 1503 and 1504 contact with each other. That is, the standard color referencing panel system for cinematography of the manual type B according to the exemplary embodiment of the present invention includes a unit that indicates the start of image capture and generates a signal sound indicating the start of image capture.

Figure 16:
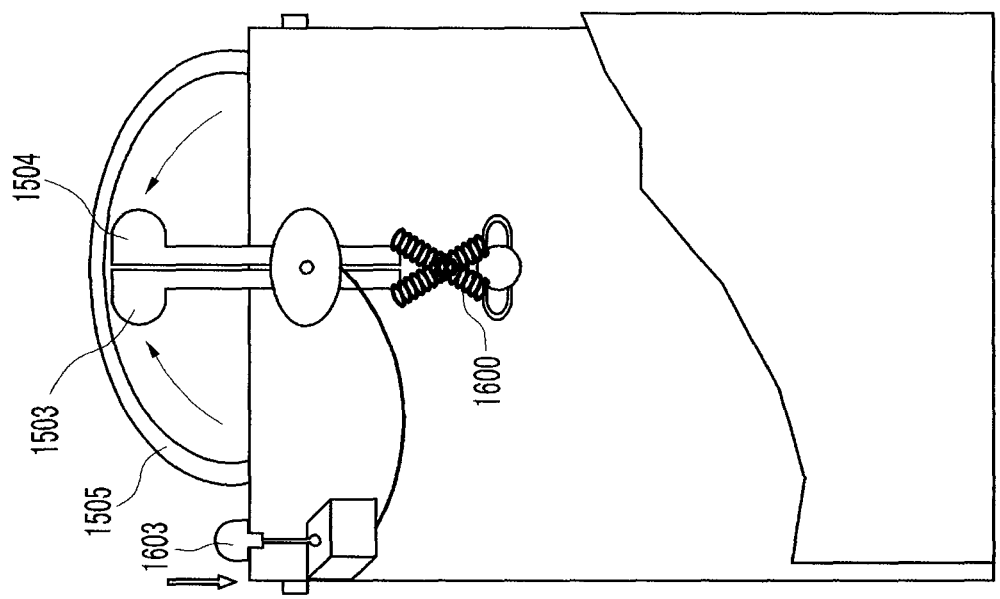
FIG. 16 is a rear view illustrating the operation of a q-shaped bar and a p-shaped bar of the standard color referencing panel system for cinematography of manual type B according to the exemplary embodiment of the present invention.
Figure 16:
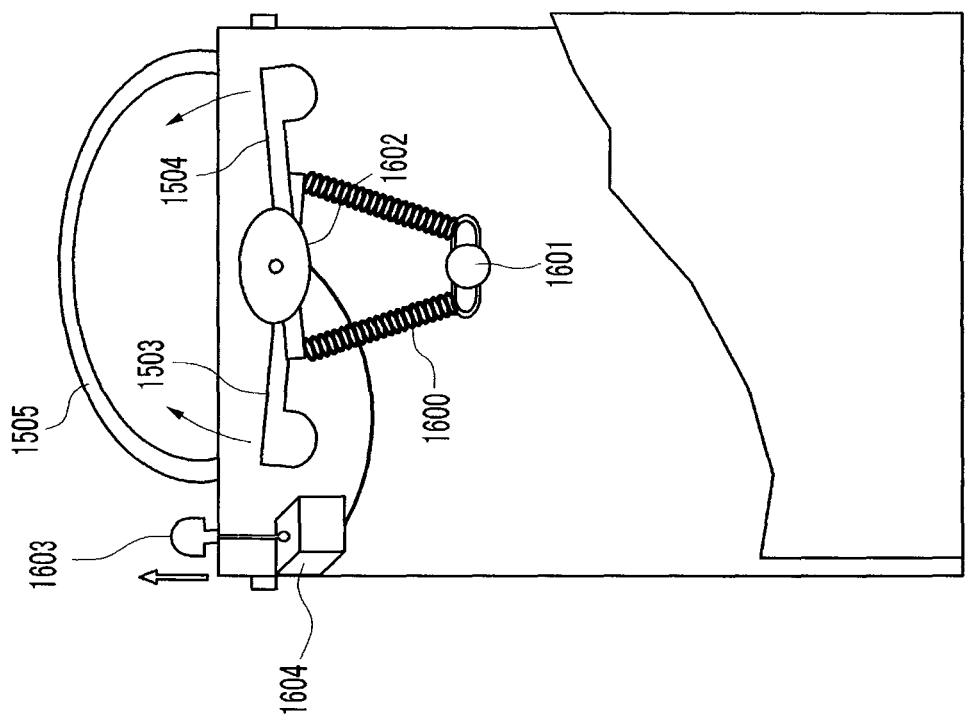

FIG. 16 is a rear view illustrating the operation of the q-shaped bar and the p-shaped bar of the standard color referencing panel system for cinematography of the manual type B according to the exemplary embodiment of the present invention.

The q-shaped bar 1503 and the p-shaped bar 1504 in the half circle member 1505 that is provided at the top of the system have functions similar to those of the arrow portion and the signal sound generating unit of the standard color referencing panel system for cinematography of the manual type A according to the exemplary embodiment of the present invention. The q-shaped bar 1503 and the p-shaped bar 1504 operate as shown in FIG. 16.

As shown in FIG. 16, the left figure shows the q-shaped bar 1503 and the p-shaped bar 1504 set in the horizontal direction.

The q-shaped bar 1503 and the p-shaped bar 1504 are pivoted about a rotating shaft 1602 to be set in the horizontal direction. When the q-shaped bar 1503 and the p-shaped bar 1504 are set in the horizontal direction, spring members 1600 connected between the end of the q-shaped bar 1503 and a fixing member 1601 and between the end of the p-shaped bar 1504 and the fixing member 1601 are stretched. That is, the restoring force of the spring members 1600 increases.

As shown in the right side of FIG. 16, when the q-shaped bar 1503 and the p-shaped bar 1504 return to a vertical position, a fricative sound is generated due to the contact therebetween, which is used as a signal sound. An image captured when the q-shaped bar 1503 and the p-shaped bar 1504 contact each other is used in a synchronization process.

When the user pushes an image capture start button 1603, a switch in a button box 1604 is turned on due to the pushing of the image capture start button 1603, and an on signal is transmitted to the rotating shaft 1602. Then, the rotating shaft 1602 receives the on signal received through the switch in the button box 1604, and is driven by the restoring force of the spring members 1600 to rotate the q-shaped bar 1503 and the p-shaped bar 1504 in the vertical direction, thereby unlocking the setting state of the bars. Then, the q-shaped bar 1503 and the p-shaped bar 1504 contact each other to generate a fricative sound, which is used as a signal sound indicating the start of image capture.

Next, a scene and standard color display unit and a standard color chart of the standard color referencing panel system for cinematography according to the exemplary embodiment of the present invention will be described in detail.

As shown in FIG. 10, standard color display content 1010 displayed by the scene and standard color display unit of the standard color referencing panel system for cinematography according to the exemplary embodiment of the present invention is composed of 90 kinds of chromatic colors 1011 and 25 kinds of achromatic colors 1012. As shown in FIG. 10, the 90 kinds of chromatic colors 1011 mean color patches that are obtained by dividing the entire range of each of six colors, such as red (R), green (G), blue (B), cyan (C), magenta (M), and yellow (Y), into 15 patches that can be displayed on the electronic frame screen. The color patches are defined at the coordinates (X, Y, Z) in a CIE XYZ standard color space and at the coordinates (L*, a*, b*) in a CIE L*a*b* standard color space that are obtained by measuring the color patches using a colorimeter while displaying the color patches on the electronic frame screen.

The 25 kinds of achromatic colors 1012 mean gray tone color patches that are obtained by dividing a color range composed of back and white into 25 patches that can be displayed on the electronic frame screen, as shown in FIG. 10. The color patches are defined at the coordinates (X, Y, Z) in the CIE XYZ standard color space and at the coordinates (L*, a*, b*) in the CIE L*a*b* standard color space that are obtained by measuring the color patches using a colorimeter while displaying the color patches on the electronic frame screen. The CIE L*a*b* standard color space (i.e., color pyramid) three-dimensionally represents the CIE L*a*b* standard color system, is based on a Munsell color system, and is an improved color system of the CIE XYZ standard color system.

The sizes of the color patches displayed on the scene and standard color display unit of the standard color referencing panel system for cinematography according to the exemplary embodiment of the present invention may increase according to the kind and characteristics of images, thereby improving accuracy. In this case, the number of colors displayed on one screen may be considerably reduced. The size and number of color patches are determined in a process of generating the standard color display content 1010 in the scene and standard color display unit of the standard color referencing panel system for cinematography according to the exemplary embodiment of the present invention.

The scene and standard color display unit of the standard color referencing panel system for cinematography according to the exemplary embodiment of the present invention displays the defined chromatic and achromatic colors 1011 and 1012 on the electronic frame screen. The standard color chart 1000 of the standard color referencing panel system for cinematography according to the exemplary embodiment of the present invention is a thick sheet having the defined chromatic and achromatic colors 1011 and 1012 printed thereon.

Therefore, the standard color chart 1000 of the standard color referencing panel system for cinematography according to the exemplary embodiment of the present invention differs from the scene and standard color display unit that displays colors on the electronic frame screen, and thus the standard color chart will be described in detail below.

As shown in the left side of FIG. 10, the standard color chart 1000 of the standard color referencing panel system for cinematography according to the exemplary embodiment of the present invention is composed of 90 kinds of chromatic colors 1001 and 25 kinds of achromatic colors 1002. As shown in FIG. 10, the 90 kinds of chromatic colors 1001 mean color patches that are obtained by dividing the entire range of each of six colors, such as red (R), green (G), blue (B), cyan (C), magenta (M), and yellow (Y), into 15 patches that can be printed by a color printer. The color patches are defined at the coordinates (X, Y, Z) in the CIE XYZ standard color space and at the coordinates (L*, a*, b*) in the CIE L*a*b* standard color space that are obtained by measuring the color patches of a printout using a colorimeter.

The 25 kinds of achromatic colors 1002 mean gray tone color patches that are obtained by dividing a color range composed of back and white into 25 patches that can be printed by the color printer, as shown in FIG. 10. The color patches are defined at the coordinates (X, Y, Z) in the CIE XYZ standard color space and at the coordinates (L*, a*, b*) in the CIE L*a*b* standard color space that are obtained by measuring the color patches of a printout using a colorimeter.

As described above, an exemplary embodiment of the present invention provides a standard color referencing panel for cinematography that is capable of accurately correcting the colors of the images captured in a movie shooting location in a post production stage, particularly, the display of the scene in the movie shooting location and the standard color referencing panel for cinematography.

Further, another exemplary embodiment of the present invention provides a standard color referencing panel system for cinematography that is capable of displaying the scene and accurately reproducing the colors of the images captured in the movie shooting location. The standard color referencing panel system for cinematography can considerably improve the accuracy of the reproduction of the colors, as compared to a method of correcting the colors of captured images without any instrument, and considerably reduce the time and cost required to correct the colors, as compared to a method of repeating trial and error to correct the colors. In addition, the system can exactly reproduce the original colors of images to improve the quality of the images. In addition, the exemplary embodiment of the present invention may provide a standard color referencing panel for cinematography that can be applied to all kinds of image capturing methods.

That is, the structure, main functions, and usage of the standard color referencing panel for cinematography of the automatic type A according to an exemplary embodiment of the present invention have been described above. The standard color referencing panel for cinematography of the automatic type A is a standard color referencing panel using the electronic frame, and has the following operations and structures: the operation of an arrow indicating the start of image capture; mechanical structure and operation for mechanically generating a signal sound; an operation of displaying the scene on the electronic frame screen; an operation of displaying the standard colors on the electronic frame screen; and the structure and operation that are capable of using the standard color chart.

In addition, the structure, main functions, and usage of the standard color referencing panel for cinematography of the automatic type B according to an exemplary embodiment of the present invention have been described above. The standard color referencing panel for cinematography of the automatic type B is a standard color referencing panel using the electronic frame, and has the following operations and structures: the operation of an arrow indicating the start of image capture; an operation of generating a signal sound indicating the start of image capture on the basis of a moving picture displayed on the electronic frame screen; an operation of displaying a scene on the electronic frame screen; an operation of displaying the standard colors on the electronic frame screen; and the structure and operation that are capable of using the standard color chart.

The structure, main functions, and usage of the standard color referencing panel for cinematography of the manual type A according to an exemplary embodiment of the present invention have been described above. In this exemplary embodiment of the present invention, the following have been described: a board formed of wood or plastic; the mechanical operation of an arrow indicating the start of image capture; an operation of generating an electrical signal sound indicating the start of image capture using a buzzer; the structure and operation capable of using scene display content; and the structure and operation that are capable of using the standard color chart.

The structure, main functions, and usage of the standard color referencing panel for cinematography of the manual type B according to an exemplary embodiment of the present invention have been described above. In this exemplary embodiment of the present invention, the following have been described: a board formed of wood or plastic; the mechanical operation of the q-shaped and q-shaped bars indicating the start of image capture; an operation of mechanically generating a signal sound indicating the start of image capture; the structure and operation that are capable of using scene display content; and the structure and operation that are capable of using the standard color chart.

The structure, main functions, and usage of the scene and standard color display unit and the standard color chart according to an exemplary embodiment of the present invention have been described above.

The above-described exemplary embodiments of the present invention can be applied to programs that allow computers to execute functions corresponding to the configurations of the exemplary embodiments of the invention or recording media including the programs as well as the method and apparatus. Those skilled in the art can easily implement the applications from the above-described exemplary embodiments of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A standard color referencing panel system for cinematography comprising:
   a memory that stores scene display content and standard color display content of an object to be captured;
   a display power button that is turned on by a user to supply power;
   an image capture start button that operates to indicate the start of image capture;
   a switch that is turned on when the image capture start button is operated to transmit signals;
   a display connector that transmits the signal received through the switch;
   a scene and standard color display unit that reads the scene display content and the standard color display content from the memory and displays the read content on a screen in response to the signals transmitted from the display connector, wherein the standard color display content includes a color chart;
   a rotating unit that is rotated in response to the signals transmitted through the switch; and
   an indicating unit that is provided above the rotating unit, is maintained at a horizontal position in an initial setting stage, and is rotated to a vertical position by the rotating unit to indicate the start of image capture.

2. The system of claim 1, further comprising:
   a button pushing unit that is provided below the rotating unit, is maintained at a horizontal position in an initial setting stage, and is rotated to a vertical position by the rotating unit;
   a buzzer button that is pushed by the button pushing unit to turn on the switch;
   a signal sound generating unit that is connected to the buzzer button, and generates a sound signal when the switch is turned on by the buzzer button; and
   a buzzer that receives the sound signal from the signal sound generating unit and generates a signal sound indicating the start of image capture.

3. The system of claim 1, further comprising
   a display auxiliary indicates the start of image capture according to whether the display unit is positioned therein.

4. The system of claim 1, further comprising:
   a scene display board that contains the scene display content;
   a display hoard fixing member that is provided at an upper part of the screen, and fixes the scene display board when the screen is not operated;
   an external color chart; and
   an external color chart fixing member that is provided at a lower part of the screen, and fixes the external color chart when the screen is not operated.

5. A standard color referencing panel system for cinematography, comprising:
   a scene display board that contains scene display content of an object to be captured;
   a display board fixing member that is provided at an upper part of the system, and fixes the scene display board;
   a standard color chart that contains standard color display content of the object to be captured;
   a standard color chart fixing member that is provided at a lower part of the system and fixes the standard color chart;
   an image capture start button that is operated to indicate the start of image capture;
   a switch that is turned on by the image capture start button;
   a rotating unit that is rotated in response to a signal transmitted through the switch;
   an indicating unit that is provided above the rotating unit, is maintained at a horizontal position in an initial setting stage, and is rotated to a vertical position by the rotating unit to indicate the start of image capture;
   a button pushing unit that is provided below the rotating unit, is maintained at a horizontal position in an initial setting stage, and is rotated to a vertical position by the rotating unit;
   a buzzer button that is pushed by the button pushing unit to turn on the switch;
   a signal sound generating unit that is connected to the buzzer button, and generates a sound signal when the switch is turned on by the buzzer button; and
   a buzzer that receives the sound signal from the signal sound generating unit and generates a signal sound indicating the start of image capture.

6. A standard color referencing panel system for cinematography, comprising:
   a scene display board that contains scene display content of an object to be captured;
   a display board fixing member that is provided at an upper part of the system, and fixes the scene display board;
   a standard color chart that contains standard color display content of the object to be captured;
   a standard color chart fixing member that is provided at a lower part of the system and fixes the standard color chart;
   an image capture start button that is operated to indicate the start of image capture;
   a switch that is turned on by the image capture start button and transmits a signal;
   a rotating unit that is rotated in response to the signal transmitted through the switch; and
   an indicating and signal sound generating unit that is provided in the rotating unit, is maintained at a horizontal position in an initial setting stage, and is rotated to a vertical position by the rotating unit to indicate the start of image capture and to generate a signal sound indicating the start of image capture.

7. The system of claim 6,
   wherein the indicating and signal sound generating unit includes:
   q-shaped and p-shaped bars that are provided in the rotating unit, pivoted about the rotating unit to be disposed at a horizontal position at an initial setting stage, and pivoted to a vertical position when the rotating unit is rotated so as to contact with each other, thereby generating a fricative sound and indicating the start of image capture;
   spring embers that are provided at one end of each of the q-shaped bar and the p-shaped bar, and are stretched when the q-shaped bar and the p-shaped bar are initially set to have high restoring force; and
   a fixing member that fixes the other ends of the spring members.

* * * * *